US012795115B2

(12) United States Patent
Lim

(10) Patent No.: US 12,795,115 B2
(45) Date of Patent: Nov. 10, 2026

(54) IMAGE ENCODING/DECODING METHOD AND RECORDING MEDIUM STORING BITSTREAM

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 18/875,185

(22) PCT Filed: Jun. 26, 2023

(86) PCT No.: PCT/KR2023/008820
§ 371 (c)(1),
(2) Date: Dec. 16, 2024

(87) PCT Pub. No.: WO2023/249468
PCT Pub. Date: Dec. 28, 2023

(65) Prior Publication Data
US 2025/0373816 A1 Dec. 4, 2025

(30) Foreign Application Priority Data
Jun. 24, 2022 (KR) ........................ 10-2022-0077704

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/172* (2014.11);
(Continued)

(58) Field of Classification Search
CPC .. H04N 19/159; H04N 19/105; H04N 19/172; H04N 19/176; H04N 19/513; H04N 19/593
(Continued)

(56) References Cited

U.S. PATENT DOCUMENTS 10,575,015 B2 * 2/2020 Lee ...................... H04N 19/625
11,509,923 B1 11/2022 Zhang et al.
(Continued)

FOREIGN PATENT DOCUMENTS

KR 10-2018-0131570 A 12/2018
KR 10-2021-0099129 A 8/2021
(Continued)

OTHER PUBLICATIONS

Korean Intellectual Property Office, International Search Report of International Application No. PCT/KR2023/008820, Oct. 6, 2023.
(Continued)

*Primary Examiner* — Matthew David Kim
(74) *Attorney, Agent, or Firm* — IP Legal Services, LLC

(57) ABSTRACT

An image encoding/decoding method according to the present invention may comprise the steps of: collecting prediction information from neighboring blocks of a current block; deriving a prediction parameter of the current block on the basis of the collected prediction information; and deriving prediction information for each of sub-blocks in the current block on the basis of the prediction parameter.

9 Claims, 16 Drawing Sheets

(a)

(b)

(51) Int. Cl.
*H04N 19/172* (2014.01)
*H04N 19/176* (2014.01)
*H04N 19/513* (2014.01)
*H04N 19/593* (2014.01)

(52) U.S. Cl.
CPC ......... *H04N 19/176* (2014.11); *H04N 19/513* (2014.11); *H04N 19/593* (2014.11)

(58) Field of Classification Search
USPC ...................................................... 375/240.12
See application file for complete search history.

(56) References Cited

U.S. PATENT DOCUMENTS

| | | | | |
|---|---|---|---|---|
| 11,516,480 | B2 * | 11/2022 | Zhang | H04N 19/105 |
| 2015/0110185 | A1 * | 4/2015 | Park | H04N 19/176 375/240.12 |
| 2019/0149836 | A1 * | 5/2019 | Moon | H04N 19/105 375/240.16 |
| 2019/0191155 | A1 * | 6/2019 | Ko | H04N 19/593 |
| 2020/0059651 | A1 * | 2/2020 | Lin | H04N 19/149 |
| 2020/0120335 | A1 * | 4/2020 | Hung | H04N 19/513 |
| 2020/0252621 | A1 * | 8/2020 | Xu | H04N 19/107 |
| 2020/0322620 | A1 * | 10/2020 | Zhao | H04N 19/44 |
| 2021/0076057 | A1 | 3/2021 | Moon et al. | |
| 2021/0136407 | A1 * | 5/2021 | Aono | H04N 19/55 |
| 2021/0144366 | A1 | 5/2021 | Zhang et al. | |
| 2021/0144388 | A1 | 5/2021 | Zhang et al. | |
| 2021/0144392 | A1 | 5/2021 | Zhang et al. | |
| 2021/0211716 | A1 | 7/2021 | Zhang et al. | |
| 2021/0377558 | A1 * | 12/2021 | Xiu | G06F 5/01 |
| 2022/0014741 | A1 * | 1/2022 | Xiu | H04N 19/46 |
| 2022/0014761 | A1 | 1/2022 | Zhang et al. | |
| 2022/0030227 | A1 | 1/2022 | Ko et al. | |
| 2022/0060712 | A1 * | 2/2022 | Zhang | H04N 19/172 |
| 2022/0078431 | A1 * | 3/2022 | Chujoh | H04N 19/46 |
| 2022/0078460 | A1 | 3/2022 | Misra et al. | |
| 2022/0272373 | A1 | 8/2022 | Moon et al. | |
| 2022/0312011 | A1 * | 9/2022 | Tamse | H04N 19/105 |
| 2022/0368916 | A1 * | 11/2022 | Zhang | H04N 19/176 |
| 2022/0400255 | A1 * | 12/2022 | Zhao | H04N 19/70 |
| 2023/0106340 | A1 | 4/2023 | Zhang et al. | |
| 2023/0308675 | A1 | 9/2023 | Misra et al. | |
| 2023/0353773 | A1 | 11/2023 | Moon et al. | |
| 2023/0370588 | A1 | 11/2023 | Ko et al. | |
| 2023/0370589 | A1 | 11/2023 | Ko et al. | |
| 2023/0370590 | A1 | 11/2023 | Ko et al. | |
| 2023/0370591 | A1 | 11/2023 | Ko et al. | |
| 2023/0421800 | A1 | 12/2023 | Moon et al. | |
| 2024/0064294 | A1 | 2/2024 | Ko et al. | |
| 2024/0121385 | A1 | 4/2024 | Ko et al. | |
| 2024/0171753 | A1 | 5/2024 | Zhang et al. | |
| 2024/0244203 | A1 | 7/2024 | Xiu et al. | |
| 2024/0283965 | A1 | 8/2024 | Moon et al. | |
| 2024/0314304 | A1 | 9/2024 | Ko et al. | |

FOREIGN PATENT DOCUMENTS

| | | | |
|---|---|---|---|
| KR | 10-2021-0134644 | A | 11/2021 |
| KR | 10-2021-0145111 | A | 12/2021 |

OTHER PUBLICATIONS

Korean Intellectual Property Office, Written Opinion of International Application No. PCT/KR2023/008820, Oct. 6, 2023.
Ramin Ghaznavi-Youvalari et al., "Regression—Based Motion Vector Field for Video Coding", IEEE Transactions on Circuits and Systems for Video Technology, May 2021, pp. 2034-2038, vol. 31, No. 5.
Yan Zhang et al., "EE2-related: Regression based affine candidate derivation", Document: JVET-Z0125-v2, Joint Video Experts Team (JVET) of ITU-T SG 16 WP 3 and ISO/IEC JTC 1/SC 29, 26th Meeting, by teleconference, Apr. 20-29, 2022, pp. 1-5.
Y. Zhang et al., "EE2-related: Regression based affine candidate derivation", JVET-Z0125, Qualcomm.
Ramin Ghaznavi-Youvalari et al., "CE4-related: Merge mode with Regression based Motion Vector Field (RMVF)", Document: JVET-L0171-r1, Joint Video Experts Team (JVET) of ITU-T SG 16 WP 3 and ISO/IEC JTC 1/SC 29/WVG 11, 12th Meeting: Macao, CN, Oct. 3-12, 2018, pp. 1-4.
Ramin Ghaznavi-Youvalari et al., JVET-L0171 CE4-related: Merge mode with Regression based Motion Vector Field (RMVF), Nokia.
Kiho Choi et al., "Video Codec Using Flexible Block Partitioning and Advanced Prediction, Transform and Loop Filtering Technologies", IEEE Transactions on Circuits and Systems for Video Technology, May 2020, pp. 1326-1345, vol. 30, No. 5.
European Patent Office, Extended European Search Report of corresponding EP Patent Application No. 23827576.2, Jul. 14, 2026.

* cited by examiner

FIG. 10

| Intra prediction mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| tanθ × 32 | X | X | 32 | 29 | 26 | 23 | 20 | 18 | 16 | 14 | 12 | 10 | 8 | 6 | 4 | 3 | 2 | 1 | 0 | -1 | -2 | -3 | -4 |
| Intra prediction mode | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
| tanθ × 32 | -6 | -8 | -10 | -12 | -14 | -16 | -18 | -20 | -23 | -26 | -29 | -32 | -29 | -26 | -23 | -20 | -18 | -16 | -14 | -12 | -10 | -8 | -6 |
| Intra prediction mode | 46 | 47 | 48 | 49 | 50 | 51 | 52 | 53 | 54 | 55 | 56 | 57 | 58 | 59 | 60 | 61 | 62 | 63 | 64 | 65 | 66 | | |
| tanθ × 32 | -4 | -3 | -2 | -1 | 0 | 1 | 2 | 3 | 4 | 6 | 8 | 10 | 12 | 14 | 16 | 18 | 20 | 23 | 26 | 29 | 32 | | |

FIG. 11

| Intra prediction mode | -14 | -13 | -12 | -11 | -10 | -9 | -8 | -7 | -6 | -5 | -4 | -3 | -2 | -1 |
|---|---|---|---|---|---|---|---|---|---|---|---|---|---|---|
| tanθ × 32 | 512 | 341 | 256 | 171 | 128 | 102 | 86 | 73 | 64 | 57 | 51 | 45 | 39 | 35 |
| Intra prediction mode | 67 | 68 | 69 | 70 | 71 | 72 | 73 | 74 | 75 | 76 | 77 | 78 | 79 | 80 |
| tanθ × 32 | 35 | 39 | 45 | 51 | 57 | 64 | 73 | 86 | 102 | 128 | 171 | 256 | 341 | 512 |

(a)

(b)

IMAGE ENCODING/DECODING METHOD AND RECORDING MEDIUM STORING BITSTREAM

CROSS REFERENCE TO RELATED APPLICATIONS

This application is a National Stage Patent Application of PCT International Patent Application No. PCT/KR2023/008820 (filed on Jun. 26, 2023) under 35 U.S.C. § 371, which claims priority to Korean Patent Application No. 10-2022-0077704 (filed on Jun. 24, 2022), the teachings of which are incorporated herein in their entireties by reference.

TECHNICAL FIELD

The present disclosure relates to a method and a device for processing an image signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The present disclosure is to provide a method and a device for deriving prediction information in a unit of a sub-block based on a prediction parameter in encoding/decoding an image signal.

The present disclosure is to provide a method and a device for deriving a prediction parameter of a current block based on prediction information of a neighboring block adjacent to a current block in encoding/decoding an image signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure includes collecting prediction information from neighboring blocks of a current block; deriving a prediction parameter of the current block based on the collected prediction information; and deriving prediction information for each of sub-blocks in the current block based on the prediction parameter.

An image encoding method according to the present disclosure includes collecting prediction information from neighboring blocks of a current block; deriving a prediction parameter of the current block based on the collected prediction information; and deriving prediction information for each of sub-blocks in the current block based on the prediction parameter.

In an image decoding/encoding method according to the present disclosure, when a prediction mode of the current block is intra prediction, the prediction information may be an intra prediction mode.

In an image decoding/encoding method according to the present disclosure, the prediction parameter includes a pair of weights and an offset, and an intra prediction mode of the sub-block may be derived by summing a first value, derived by a multiplication between a x-axis position of the sub-block and a first weight, a second value, derived by a multiplication between a y-axis position of the sub-block and a second weight, and the offset.

In an image decoding/encoding method according to the present disclosure, when a result value obtained by summing the first value, the second value and the offset is out of the range of a predefined intra prediction mode, the result value may be clipped to derive the intra prediction mode of the sub-block.

In an image decoding/encoding method according to the present disclosure, when a result value obtained by summing the first value, the second value and the offset is out of the range of a predefined intra prediction mode, the intra prediction mode of the sub-block may be derived by adding or subtracting a predefined constant to or from the result value.

In an image decoding/encoding method according to the present disclosure, when a prediction mode of the current block is inter prediction, the prediction information may be a motion vector.

In an image decoding/encoding method according to the present disclosure, when a reference picture of a neighboring block is different from a basis reference picture, a scaled motion vector of the neighboring block may be collected.

In an image decoding/encoding method according to the present disclosure, the basis reference picture may be a first reference picture in a reference picture list or may be a reference picture closest to a current picture in the reference picture list.

In an image decoding/encoding method according to the present disclosure, the prediction parameter may be derived independently for each of a L0 direction and a L1 direction.

In an image decoding/encoding method according to the present disclosure, when inter prediction based on an affine model is applied to the current block, control point motion vectors of the current block may be derived based on the prediction parameter, and a motion vector of each of the sub-blocks may be derived based on the control point motion vectors.

An image decoding/encoding method according to the present disclosure may further include determining whether to derive the prediction parameter based on the collected prediction information. In this case, when it is determined that the prediction parameter is not derived based on the collected prediction information, the prediction parameter may be derived from a neighboring block adjacent to the current block.

In an image decoding/encoding method according to the present disclosure, a prediction parameter of the current block may be set to be the same as a prediction parameter of the neighboring block.

In an image decoding/encoding method according to the present disclosure, a neighboring block used by the current block to derive a prediction parameter may be specified based on index information.

A computer readable recording medium storing a bit-stream encoded by an image encoding method according to the present disclosure may be provided.

Technical Effect

According to the present disclosure, prediction information may be derived in a unit of a sub-block based on a prediction parameter, improving encoding/decoding efficiency.

According to the present disclosure, a prediction parameter of a current block may be derived by referring to a pre-reconstructed neighboring block, improving encoding/decoding efficiency.

Effects obtainable from the present disclosure are not limited to the above-mentioned effects and other unmentioned effects may be clearly understood from the following description by those having ordinary skill in the technical field to which the present disclosure pertains.

BRIEF DESCRIPTION OF DRAWINGS

FIGS. 10 and 11 show that a tangent value for an angle is scaled 32 times per intra prediction mode.

MODE FOR INVENTION

Figure 1:
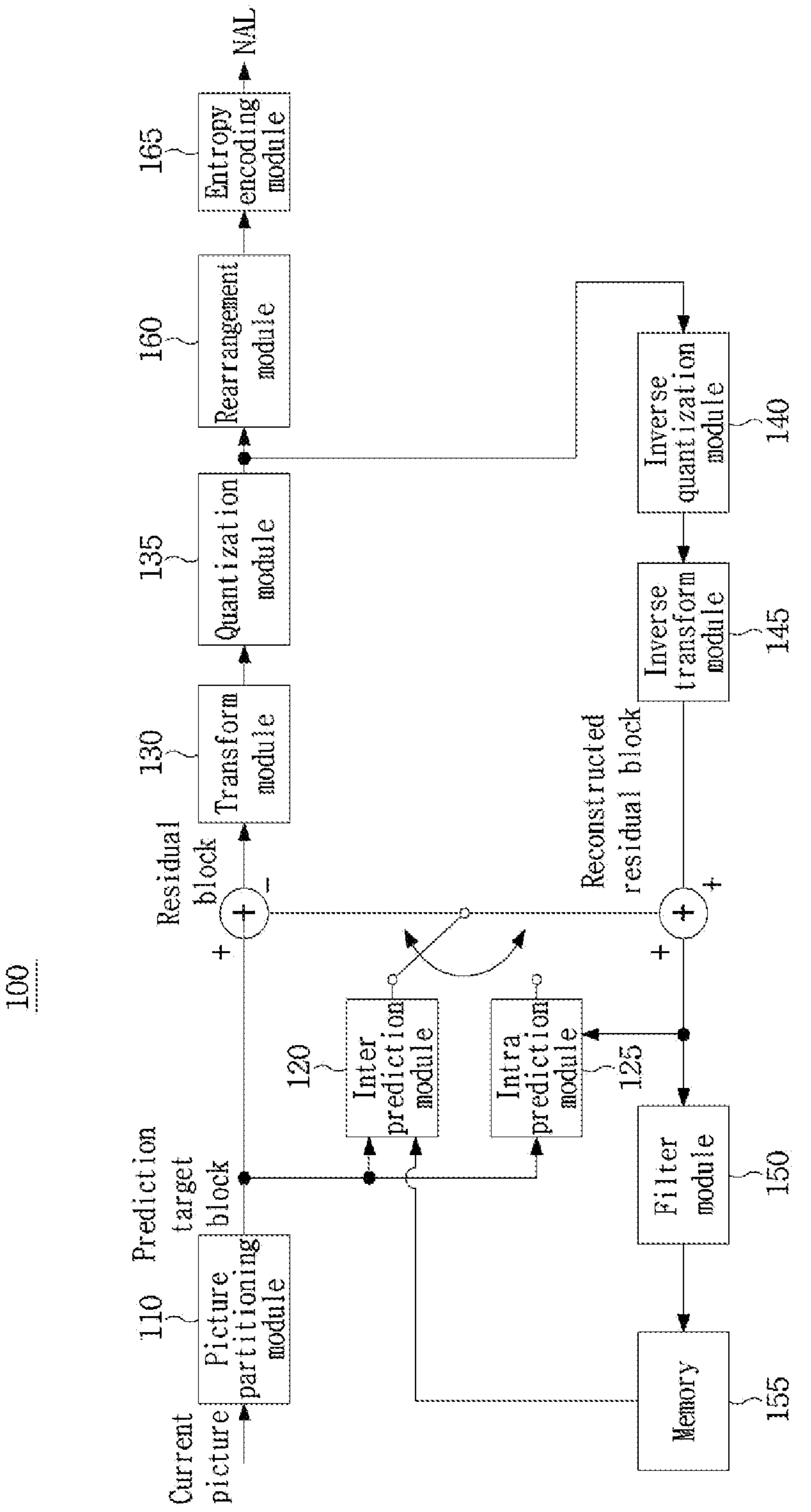
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

When a prediction unit for which intra prediction is performed based on a coding unit is generated and it is not the minimum coding unit, intra prediction may be performed without being partitioned into a plurality of prediction units N×N.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information around a current block which is pixel information in a current picture. When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, if a size of a prediction unit is different from a size of a transform unit when intra prediction is performed, intra prediction may be performed by using a reference pixel based on a transform unit. In addition, intra prediction using N×N partition may be used only for the minimum coding unit.

An intra prediction method may generate a prediction block after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on intra prediction mode information in a prediction unit used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction or horizontal scan where a coefficient in a shape of a two-dimensional block is scanned in a row direction may be used. In other words, which scan method among zig-zag scan, vertical directional scan and horizontal directional scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
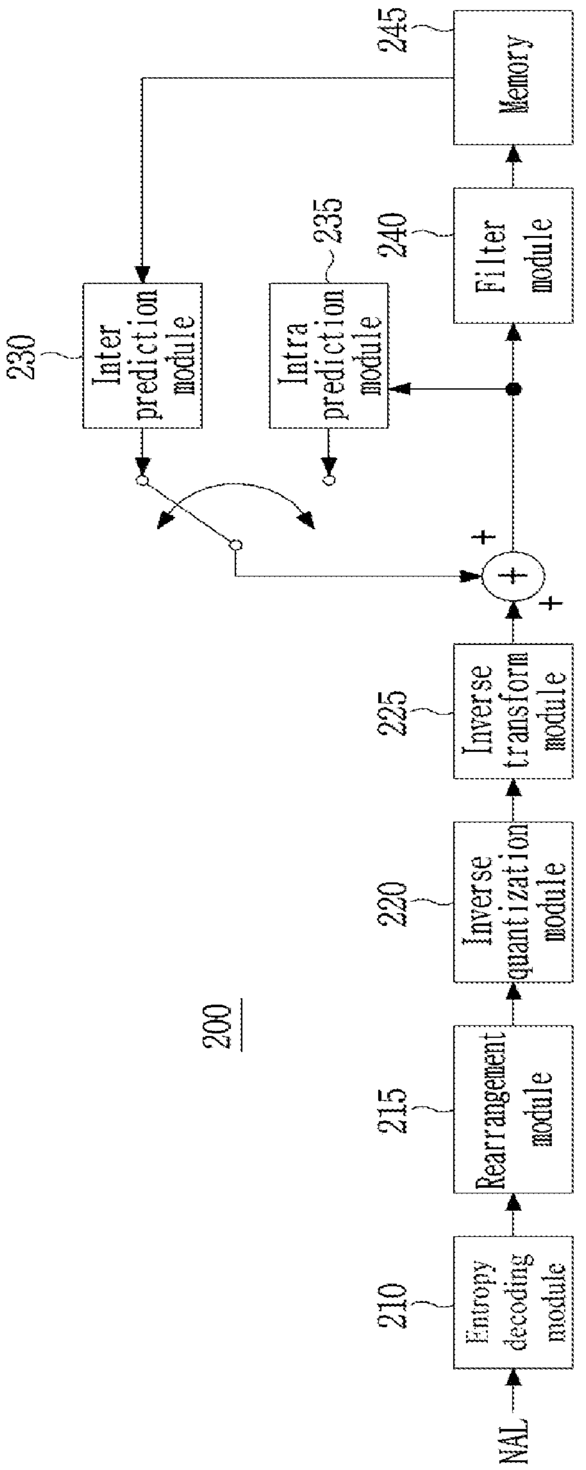
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information d to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction mode, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and an ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

An ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

Figure 3:
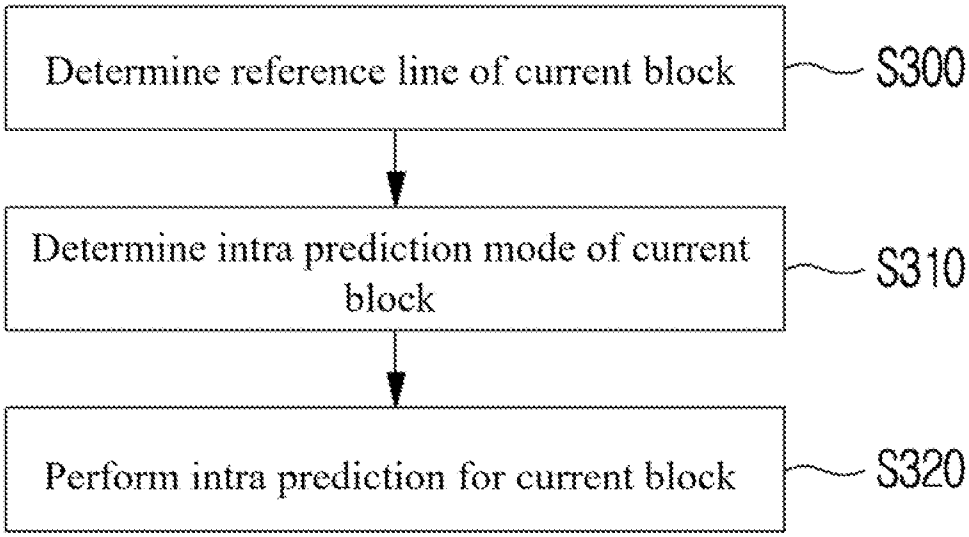
FIG. 3 shows an image encoding/decoding method performed by an image encoding/decoding device according to the present disclosure.

FIG. 3 shows an image encoding/decoding method performed by an image encoding/decoding device according to the present disclosure.

Referring 3, a reference line for intra prediction of a current block may be determined S300.

A current block may use one or more of a plurality of reference line candidates pre-defined in an image encoding/decoding device as a reference line for intra prediction. Here, a plurality of pre-defined reference line candidates may include a neighboring reference line adjacent to a current block to be decoded and N non-neighboring reference lines 1-sample to N-samples away from a boundary of a current block. N may be an integer of 1, 2, 3 or more. Hereinafter, for convenience of a description, it is assumed that a plurality of reference line candidates available for a current block consist of a neighboring reference line candidate and three non-neighboring reference line candidates, but it is not limited thereto. In other words, of course, a plurality of reference line candidates available for a current block may include four or more non-neighboring reference line candidates.

An image encoding device may determine an optimal reference line candidate among a plurality of reference line candidates and encode an index for specifying it. An image decoding device may determine a reference line of a current block based on an index signaled through a bitstream. The index may specify any one of a plurality of reference line candidates. A reference line candidate specified by the index may be used as a reference line of a current block.

The number of indexes signaled to determine a reference line of a current block may be 1, 2 or more. As an example, when the number of indexes signaled above is 1, a current block may perform intra prediction by using only a single reference line candidate specified by the signaled index among a plurality of reference line candidates. Alternatively, when the number of indexes signaled above is at least two, a current block may perform intra prediction by using a plurality of reference line candidates specified by a plurality of indexes among a plurality of reference line candidates.

Referring to FIG. 3, an intra prediction mode of a current block may be determined S310.

An intra prediction mode of a current block may be determined among a plurality of intra prediction modes pre-defined in an image encoding/decoding device. The plurality of pre-defined intra prediction modes are described by referring to FIGS. 4 and 5.

Figure 4:
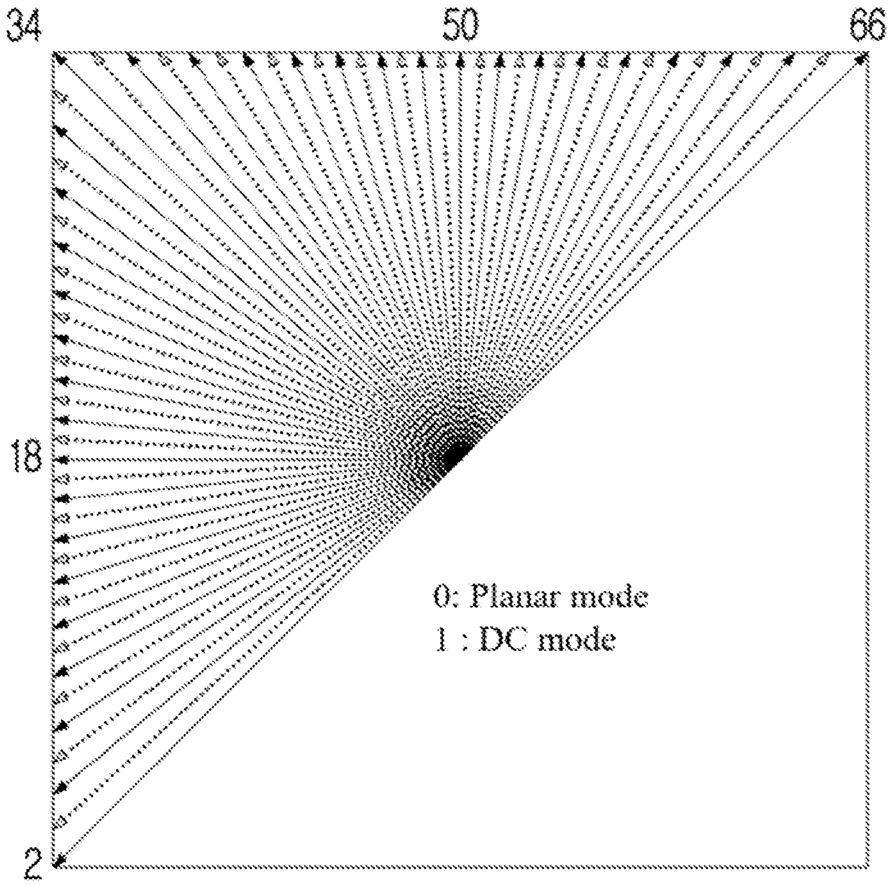
FIGS. 4 and 5 show an example of a plurality of intra prediction modes according to the present disclosure.

FIG. 4 shows an example of a plurality of intra prediction modes according to the present disclosure.

Referring to FIG. 4, a plurality of intra prediction modes pre-defined in an image encoding/decoding device may be composed of a non-directional mode and a directional mode. A non-directional mode may include at least one of a planar mode or a DC mode. A directional mode may include directional mode 2 to 66.

Figure 5:
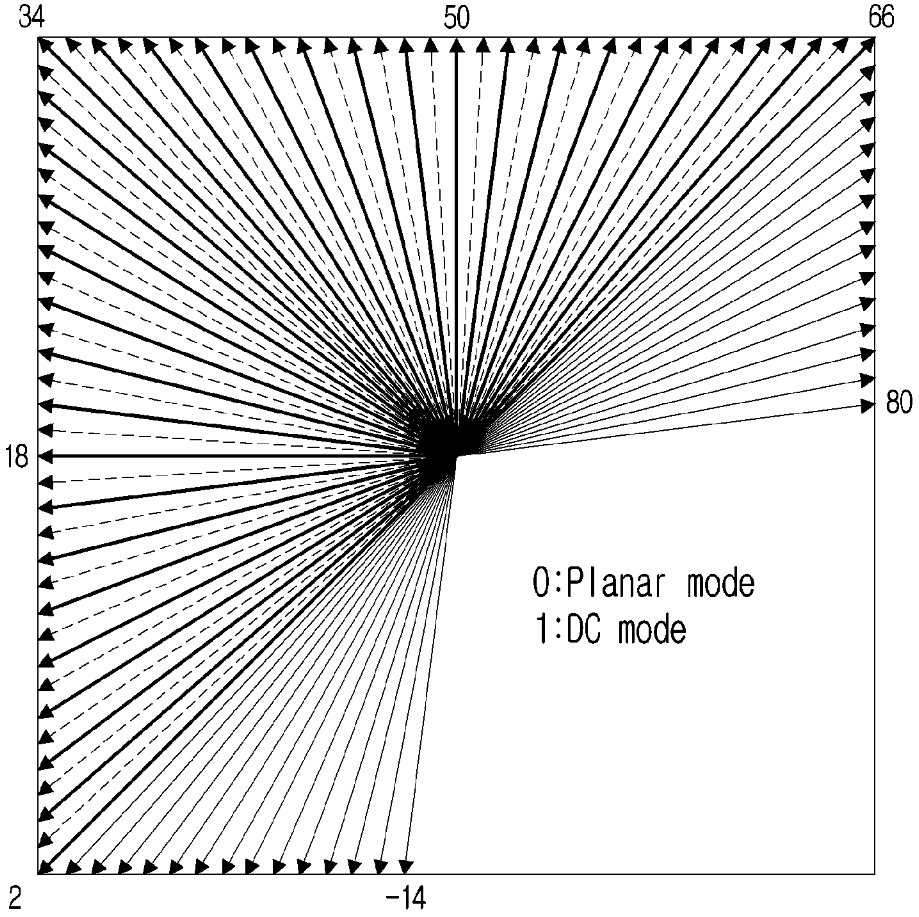

A directional mode may be expanded more than shown in FIG. 4. FIG. 5 shows an example in which a directional mode is expanded.

In FIG. 5, it was illustrated that mode −1 to mode −14 and mode 67 to mode 80 are added. These directional modes may be referred to as a wide-angle intra prediction mode. Whether to use a wide-angle intra prediction mode may be determined according to a shape of a current block. As an example, if a current block is a non-square block whose width is greater than a height, some directional modes (e.g., No. 2 to No. 15) may be transformed to a wide-angle intra prediction mode between No. 67 and No. 80. On the other hand, if a current block is a non-square block whose height is greater than a width, some directional modes (e.g., No. 53 to No. 66) may be transformed to a wide-angle intra prediction mode between No. −1 and No. −14.

A scope of available wide-angle intra prediction modes may be adaptively determined according to a width-to-height ratio of a current block. Table 1 shows a scope of available wide-angle intra prediction modes according to a width-to-height ratio of a current block.

TABLE 1

| Width/Height | Available wide-angle intra prediction mode range |
|---|---|
| W/H = 16 | 67~80 |
| W/H = 8 | 67~78 |
| W/H = 4 | 67~76 |
| W/H = 2 | 67~74 |
| W/H = 1 | None |
| W/H = ½ | −1~−8 |
| W/H = ¼ | −1~−10 |
| W/H = ⅛ | −1~−12 |
| W/H = 1/16 | −1~−14 |

Among the plurality of intra prediction modes, K candidate modes (most probable mode, MPM) may be selected. A candidate list including a selected candidate mode may be generated. An index indicating any one of candidate modes belonging to a candidate list may be signaled. An intra prediction mode of a current block may be determined based on a candidate mode indicated by the index. As an example, a candidate mode indicated by the index may be configured as an intra prediction mode of a current block. Alternatively, an intra prediction mode of a current block may be determined based on a value of a candidate mode indicated by the index and a predetermined difference value. The difference value may be defined as a difference between a value of an intra prediction mode of the current block and a value of a candidate mode indicated by the index. The difference value may be signaled through a bitstream. Alternatively, the difference value may be a value pre-defined in an image encoding/decoding device. Alternatively, an intra prediction mode of a current block may be determined based on a flag showing whether a mode identical to an intra prediction mode of a current block exists in the candidate list. As an example, when the flag is a first value, an intra prediction mode of a current block may be determined from the candidate list. In this case, an index indicating any one of a plurality of candidate modes belonging to a candidate list may be signaled. A candidate mode indicated by the index may be configured as an intra prediction mode of a current block. On the other hand, when the flag is a second value, any one of the remaining intra prediction modes may be configured as an intra prediction mode of a current block. The remaining intra prediction modes may refer to a mode excluding a candidate mode belonging to the candidate list among a plurality of pre-defined intra prediction modes. When the flag is a second value, an index indicating any one of the remaining intra prediction modes may be signaled. An intra prediction mode indicated by the signaled index may be configured as an intra prediction mode of a current block. An intra prediction mode of a chroma block may be selected among intra prediction mode candidates of a plurality of chroma blocks. To this end, index information indicating one of intra prediction mode candidates of a chroma block may be explicitly encoded and signaled through a bitstream. Table 2 illustrates intra prediction mode candidates of a chroma block.

TABLE 2

| | Intra Prediction Mode Candidate for Chroma Block | | | | |
|---|---|---|---|---|---|
| Index | Luma Mode: 0 | Luma Mode: 50 | Luma Mode: 18 | Luma Mode: 1 | Others |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | | | DM | | |

In an example of Table 2, a direct mode (DM) refers to setting an intra prediction mode of a luma block existing at the same position as a chroma block as an intra prediction mode of a chroma block. As an example, if an intra prediction mode (a luma mode) of a luma block is No. 0 (a planar mode) and an index indicates No. 2, an intra prediction mode of a chroma block may be determined as a horizontal mode (No. 18). As an example, if an intra prediction mode (a luma mode) of a luma block is No. 1 (a DC mode) and an index indicates No. 0, an intra prediction mode of a chroma block may be determined as a planar mode (No. 0). As a result, an intra prediction mode of a chroma block may be also set as one of intra prediction modes shown in FIG. 4 or FIG. 5. An intra prediction mode of a current block may be used to determine a reference line of a current block, and in this case, S310 may be performed before S300.

Referring to FIG. 3, intra prediction may be performed for a current block based on a reference line and an intra prediction mode of a current block S320.

Hereinafter, an intra prediction method per intra prediction mode is described in detail by referring to FIGS. 6 to 8. However, for convenience of a description, it is assumed that a single reference line is used for intra prediction of a current block, but even when a plurality of reference lines are used, an intra prediction method described later may be applied in the same/similar manner.

Figure 6:
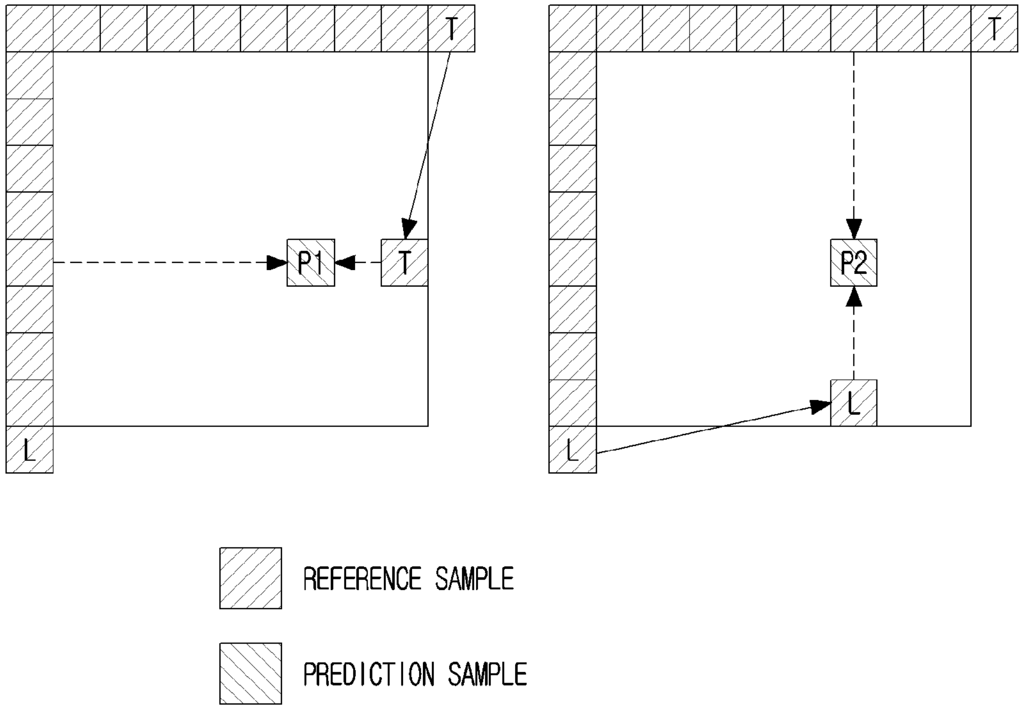
FIG. 6 shows an intra prediction method based on a planar mode according to the present disclosure.

FIG. 6 shows an intra prediction method based on a planar mode according to the present disclosure.

Referring to FIG. 6, T represents a reference sample position at a top-right corner of a current block and L represents a reference sample positioned at a bottom-left corner of a current block. P1 may be generated through interpolation in a horizontal direction. As an example, P1 may be generated by interpolating T with a reference sample positioned on the same horizontal line as P1. P2 may be generated through interpolation in a vertical direction. As an example, P2 may be generated by interpolating L with a reference sample positioned on the same vertical line as P2. A current sample in a current block may be predicted through a weighted sum of P1 and P2 as in Equation 3 below.

$$(\alpha \times P1 + \beta \times P2)/(\alpha + \beta) \qquad \text{[Equation 1]}$$

In Equation 1, weight α and β may be determined by considering a width and a height of a current block. According to a width and a height of a current block, weight α and β may have the same value or a different value. If a width and a height of a current block are the same, weight α and β may be configured to be the same and a prediction sample of a current sample may be configured as an average value of P1 and P2. When a width and a height of a current block are not the same, weight α and β may have a different value. As an example, when a width is greater than a height, a smaller value may be configured to a weight corresponding to a width of a current block and a larger value may be configured to a weight corresponding to a height of a current block. Conversely, when a width is greater than a height, a larger value may be configured to a weight corresponding to a width of a current block and a smaller value may be configured to a weight corresponding to a height of a current block. Here, a weight corresponding to a width of a current block may refer to β and a weight corresponding to a height of a current block may refer to FIG. 7 shows an intra prediction method based on a DC mode according to the present disclosure.

Figure 7:
FIG. 7 shows an intra prediction method based on a DC mode according to the present disclosure.

Referring to FIG. 7, an average value of a surrounding sample adjacent to a current block may be calculated, and a calculated average value may be configured as a prediction value of all samples in a current block. Here, a surrounding samples may include a top reference sample and a left reference sample of a current block. However, according to a shape of a current block, an average value may be calculated by using only a top reference sample or a left reference sample. As an example, when a width of a current block is greater than a height, an average value may be calculated by using only a top reference sample of a current block. Alternatively, when a ratio of a width and a height of a current block is greater than or equal to a predetermined threshold value, an average value may be calculated by using only a top reference sample of a current block. Alternatively, when a ratio of a width and a height of a current block is smaller than or equal to a predetermined threshold value, an average value may be calculated by using only a top reference sample of a current block. On the other hand, when a width of a current block is smaller than a height, an average value may be calculated by using only a left reference sample of a current block. Alternatively, when a ratio of a width and a height of a current block is smaller than or equal to a predetermined threshold value, an average value may be calculated by using only a left reference sample of a current block. Alternatively, when a ratio of a width and a height of a current block is greater than or equal to a predetermined threshold value, an average value may be calculated by using only a left reference sample of a current block.

Figure 8:
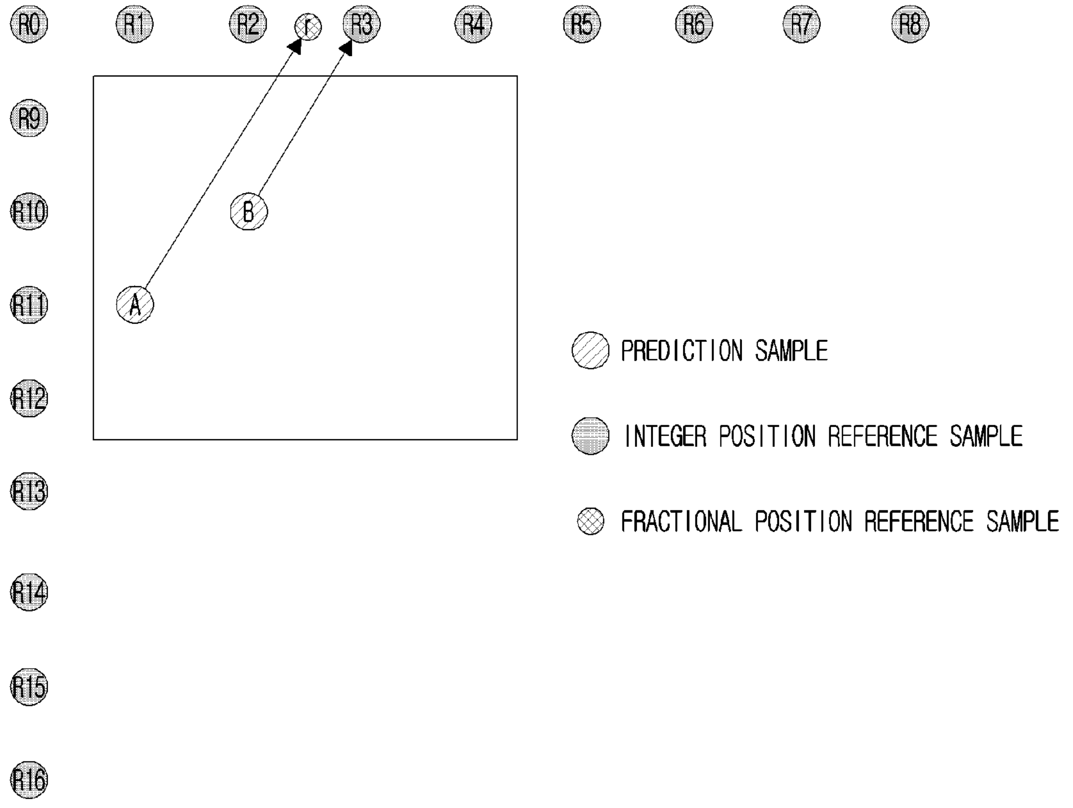
FIG. 8 shows an intra prediction method based on a directional mode according to the present disclosure.

FIG. 8 shows an intra prediction method based on a directional mode according to the present disclosure.

When an intra prediction mode of a current block is a directional mode, projection may be performed to a reference line according to an angle of a corresponding directional mode. When a reference sample exists at a projected position, a corresponding reference sample may be configured as a prediction sample of a current sample. If a reference sample does not exist at a projected position, a sample corresponding to a projected position may be generated by using one or more surrounding samples neighboring a projected position. As an example, interpolation may be performed based on two or more surrounding samples neighboring bidirectionally based on a projected position to generate a sample corresponding to a projected position. Alternatively, one surrounding sample neighboring a projected position may be configured as a sample corresponding to a projected position. In this case, among a plurality of surrounding samples neighboring a projected position, a surrounding sample closest to a projected position may be used. A sample corresponding to a projected position may be configured as a prediction sample of a current sample.

Referring to FIG. 8, for current sample B, when projection is performed to a reference line according to an angle of an intra prediction mode at a corresponding position, a reference sample exists at a projected position (i.e., a reference sample at an integer position, R3). In this case, a reference sample at a projected position may be configured as a prediction sample of current sample B. For current sample A, when projection is performed to a reference line according to an angle of an intra prediction mode at a corresponding position, a reference sample (i.e., a reference sample at an integer position) does not exists at a projected position. In this case, interpolation may be performed based on surrounding samples (e.g., R2 and R3) neighboring a projected position to generate a sample (r) at a fractional position. A generated sample (r) at a fractional position may be configured as a prediction sample of current sample A.

Figure 9:
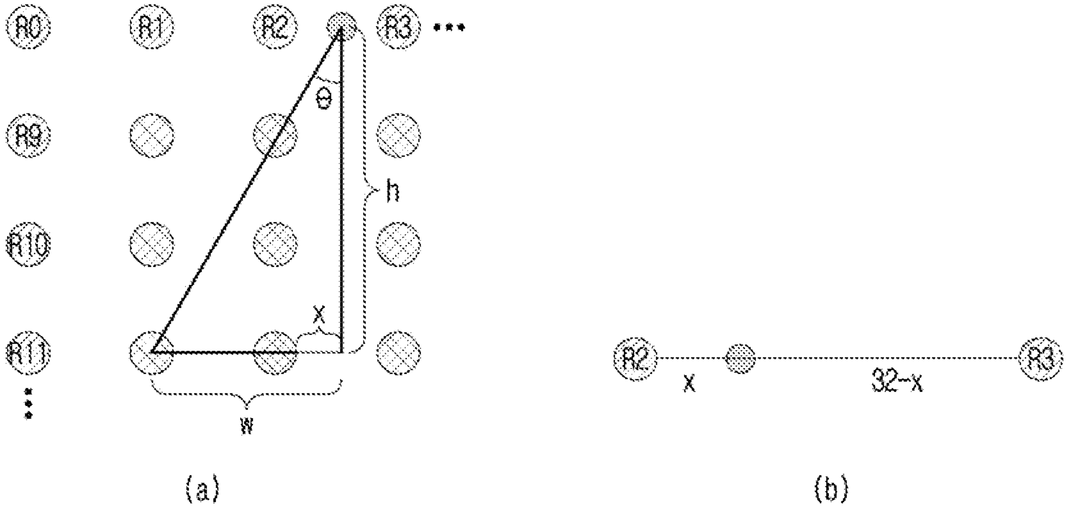
FIG. 9 shows a method for deriving a sample at a fractional position.

FIG. 9 shows a method for deriving a sample at a fractional position.

In an example of FIG. 9, variable h refers to a vertical distance (i.e., a vertical distance) from a position of prediction sample A to a reference sample line, and variable w refers to a horizontal distance (i.e., a horizontal distance) from a position of prediction sample A to a fractional position sample. In addition, variable θ refers to an angle which is predefined according to directivity of an intra prediction mode, and variable x refers to a fractional position.

Variable w may be derived as in Equation 2 below.

$$w = \tan\theta \qquad \text{[Equation 2]}$$

Then, if an integer position is removed from variable w, finally, a fractional position may be derived.

A fractional position sample may be generated by interpolating adjacent integer position reference samples. As an example, a fractional position reference sample at a x position may be generated by interpolating integer position reference sample R2 and integer position reference sample R3.

In deriving a fractional position sample, a scaling factor may be used to avoid a real number operation. As an example, when scaling factor f is set as 32, as in an example shown in FIG. 8(*b*), a distance between neighboring integer reference samples may be set as 32, not 1.

In addition, a tangent value for angle θ determined according to directivity of an intra prediction mode may be also scaled up by using the same scaling factor (e.g., 32).

FIGS. 10 and 11 show that a tangent value for an angle is scaled 32 times per intra prediction mode.

FIG. 10 shows a scaled result of a tangent value for a non-wide angle intra prediction mode, and FIG. 11 shows a scaled result of a tangent value for a wide angle intra prediction mode.

If a tangent value (tan θ) for an angle value of an intra prediction mode is positive, intra prediction may be performed by using only one of reference samples belonging to a top line of a current block (i.e., top reference samples) or reference samples belonging to a left line of a current block (i.e., left reference samples). Meanwhile, when a tangent value for an angle value of an intra prediction mode is negative, both reference samples at a top position and reference samples at a left position are used.

In this case, in order to simplify implementation, left reference samples may be projected to the top or may be projected to the left to arrange reference samples in a 1D array form, and reference samples in a 1D array form may be used to perform intra prediction.

Figure 12:
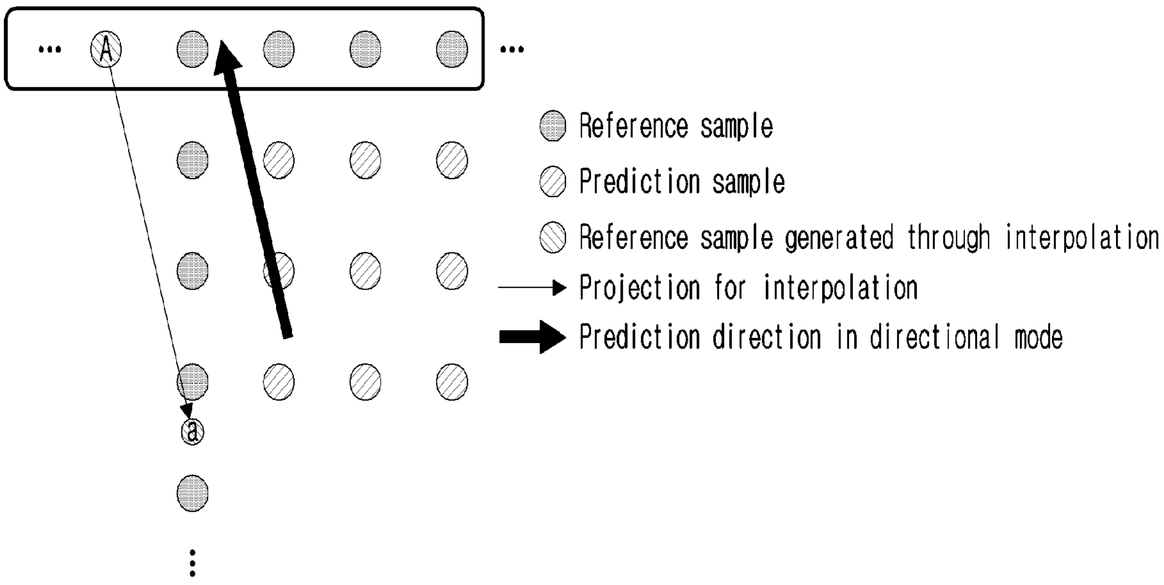
FIG. 12 is a diagram illustrating an intra prediction aspect when a directional mode is one of mode no. 34 to mode no. 49.

FIG. 12 is a diagram illustrating an intra prediction aspect when a directional mode is one of mode no. 34 to mode no. 49.

When an intra prediction mode of a current block is one of mode no. 34 to mode no. 49, intra prediction is performed by using not only top reference samples of a current block, but also left reference samples. In this case, as in an example shown in FIG. 12, a reference sample of a top line may be generated by copying a reference sample at a left position of a current block to a position of a top line or by interpolating reference samples at a left position.

As an example, when a reference sample for position A on the top of a current block is obtained, considering directivity of an intra prediction mode of a current block, projection may be performed on a left line of a current block at position A on a top line. If a projected position is called a, a value corresponding to position a may be copied or a fractional position value corresponding to a may be generated and set as a value of position A. As an example, if position a is an integer position, a value of position A may be generated by copying an integer position reference sample. On the other hand, when position a is a fractional position, a reference sample at a top position of position a and a reference sample at a bottom position of position a may be interpolated and an interpolated value may be set as a value of position A. Meanwhile, at position A on the top of a current block, a direction projected to a left line of a current block may be parallel to and opposite to a direction of an intra prediction mode of a current block.

Figure 13:
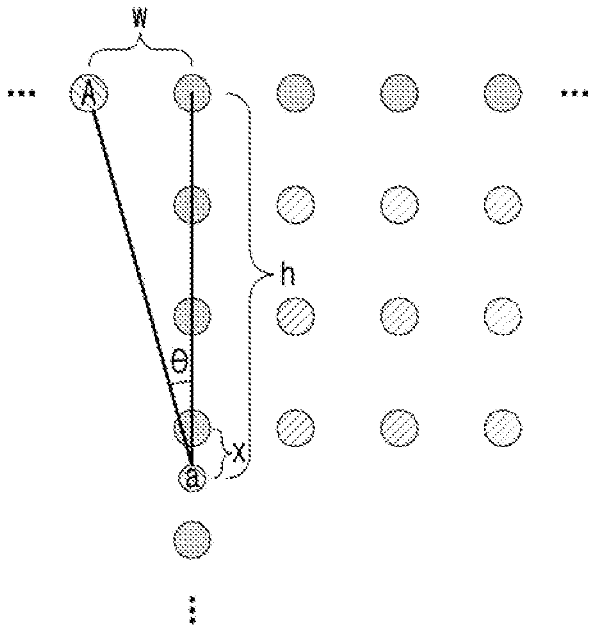
FIG. 13 is a diagram for describing an example of generating a top reference sample by interpolating left reference samples.

FIG. 13 is a diagram for describing an example of generating a top reference sample by interpolating left reference samples.

In FIG. 13, variable h represents a horizontal distance between position A on a top line and position a on a left line. Variable w represents a vertical distance between position A on a top line and position a on a left line. In addition, variable θ refers to an angle predefined according to directivity of an intra prediction mode, and variable x refers to a fractional position.

Variable h may be derived as in Equation 3 below.

$$h = w/\tan\theta \qquad \text{[Equation 3]}$$

Afterwards, if an integer position is removed from variable h, a fractional position may be derived finally.

In deriving a fractional position sample, a scaling factor may be used to avoid a real number operation. As an example, a tangent value for variable θ may be scaled by using scaling factor f1. Here, since a direction projected to a left line is parallel and opposite to a directional prediction mode, a scaled tangent value shown in FIGS. 10 and 11 may be used.

When scaling factor f1 is applied, Equation 3 may be modified and used as in Equation 4 below.

$$h = (w * f1 * f2)/(f1 * \tan\theta) \qquad \text{[Equation 4]}$$

In the same way as above, a 1D reference sample array may be configured only with reference samples belonging to a top line. As a result, intra prediction for a current block may be performed by using only top reference samples composed of 1D arrays.

Figure 14:
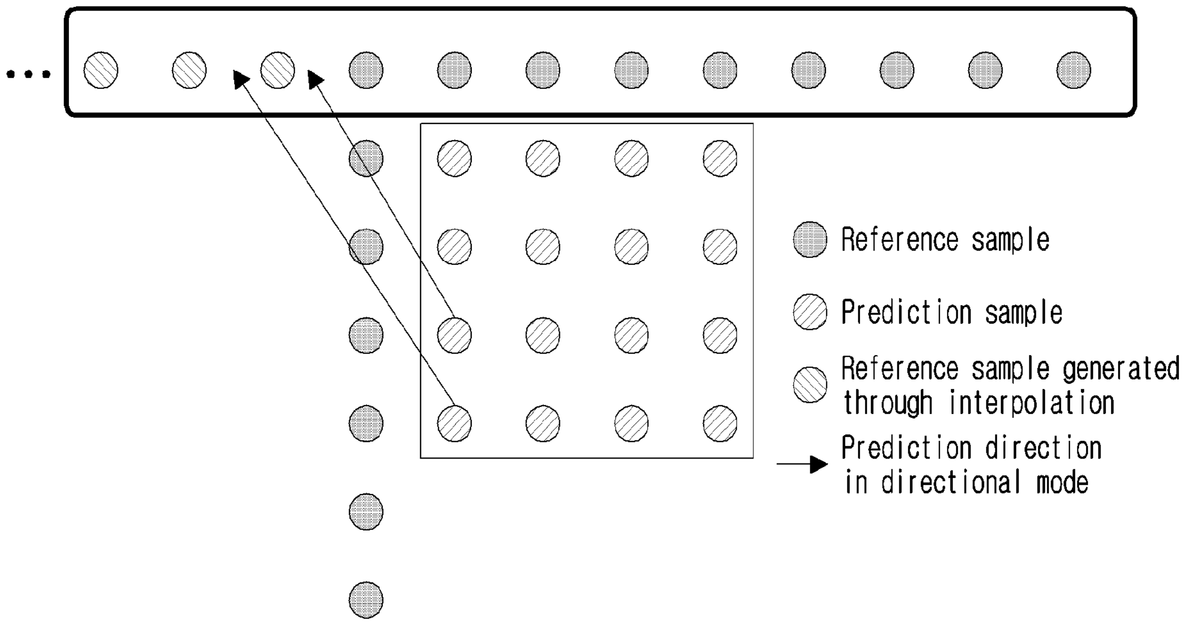
FIG. 14 shows an example in which intra prediction is performed by using reference samples arranged in a 1D array.

FIG. 14 shows an example in which intra prediction is performed by using reference samples arranged in a 1D array.

As in an example shown in FIG. 14, left reference samples may be projected to generate top reference samples, and accordingly, prediction samples of a current block may be obtained by using only reference samples belonging to a top line.

Contrary to what is shown in FIGS. 12 and 14, top reference sample may be projected to a left line to configure a 1D reference sample array only with reference samples belonging to a left line. Specifically, for mode no. 19 to no. 33 of directional modes in which a tangent value (tan θ) for an angle of a directional mode is negative, reference samples belonging to a top line may be projected to a left line to generate a left reference sample.

In encoding a current picture, redundant data between pictures may be removed through inter prediction. Inter prediction may be performed in a unit of a block. Specifically, a prediction block of a current block may be generated from a reference picture by using the motion information of a current block. Here, motion information may include at least one of a motion vector, a reference picture index and a prediction direction.

Figure 15:
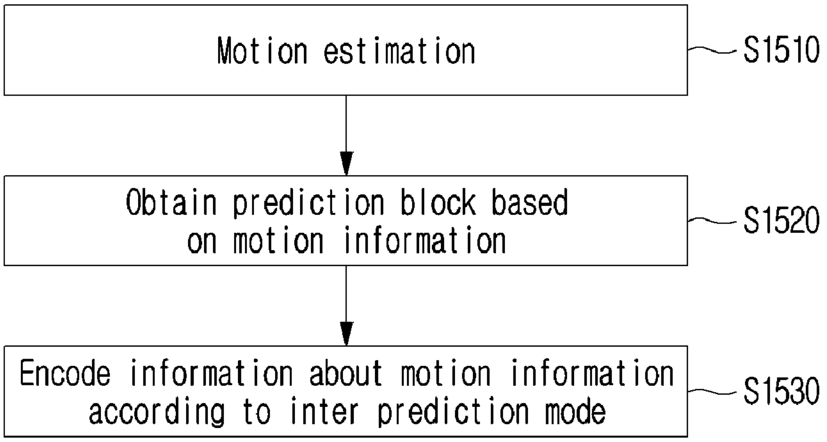
FIGS. 15 and 16 are a flowchart of an inter prediction method.
Figure 16:
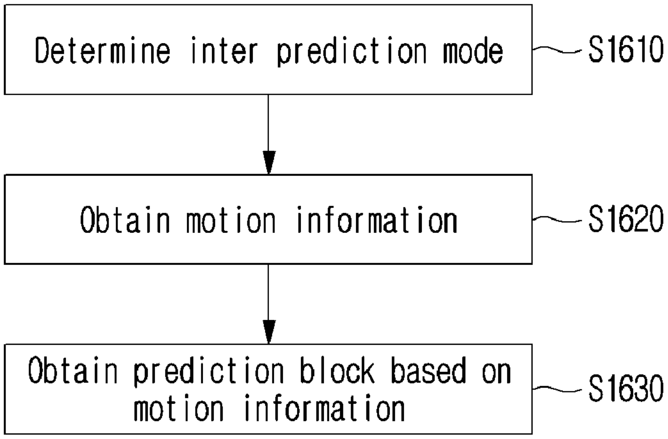

FIGS. 15 and 16 are a flowchart of an inter prediction method.

FIG. 15 represents an operation of an encoder, and FIG. 16 represents an operation of a decoder.

In an encoder, motion estimation is performed S1510, and a prediction block is obtained based on motion information derived from a motion estimation result S1520. Here, motion information may include at least one of a motion vector, a reference picture index, motion vector precision, a bidirectional weight, whether to perform L0 prediction or whether to perform L1 prediction.

Furthermore, in an encoder, an inter prediction mode for performing inter prediction may be determined, and information for deriving motion information may be encoded according to a determined inter prediction mode S1530.

In a decoder, an inter prediction mode may be determined based on information signaled from a bitstream S1610, and motion information may be obtained according to a determined inter prediction mode S1620. Once motion information is obtained, a prediction block of a current block may be obtained based on obtained motion information S1630.

Hereinafter, each step will be described in detail.

The motion information of a current block may be generated through motion estimation.

Figure 17:
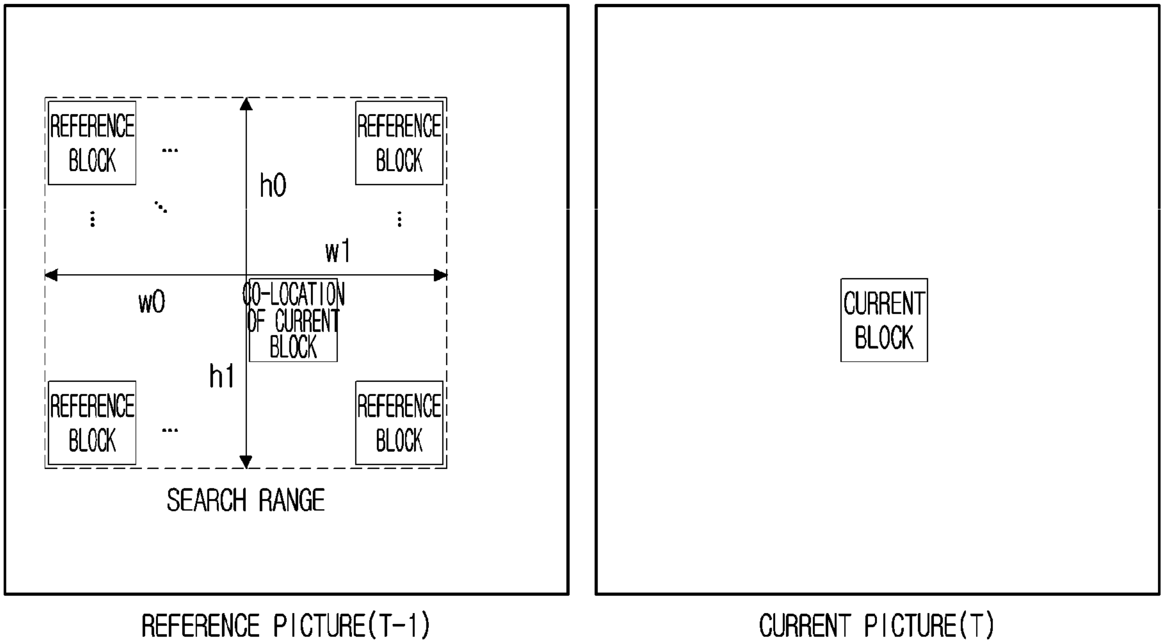
FIG. 17 shows an example in which motion estimation is performed.

FIG. 17 shows an example in which motion estimation is performed.

In FIG. 17, it was assumed that a Picture Order Count (POC) of a current picture is T and a POC of a reference picture is (T−1).

A search range for motion estimation may be set from the same position as a reference point of a current block in a reference picture. Here, a reference point may be a position of a top-left sample of a current block.

As an example, in FIG. 17, it was illustrated that based on a reference point, a square in a size of (w0+w01) and (h0+h1) is set as a search range. In the example, w0, w1, h0 and h1 may have the same value. Alternatively, at least one of w0, w1, h0 and h1 may be set to have a different value from the other. Alternatively, a size of w0, w1, h0 and h1 may be determined not to exceed a Coding Tree Unit (CTU) boundary, a slice boundary, a tile boundary or a picture boundary.

Within a search range, reference blocks having the same size as a current block may be set, and then a cost with a current block may be measured for each reference block. A cost may be calculated by using a similarity between two blocks.

As an example, a cost may be calculated based on the sum of absolute differences (SAD) between original samples in a current block and original samples (or reconstructed samples) in a reference block. As a SAD is smaller, a cost may be reduced.

Afterwards, after comparing a cost of each reference block, a reference block with an optimal cost may be set as a prediction block of a current block.

Then, a distance between a current block and a reference block may be set as a motion vector. Specifically, a x-coordinate difference and a y-coordinate difference between a current block and a reference block may be set as a motion vector.

Furthermore, an index of a picture including a reference block specified through motion estimation is set as a reference picture index.

In addition, a prediction direction may be set based on whether a reference picture belongs to a L0 reference picture list or a L1 reference picture list.

In addition, motion estimation may be performed for each of a L0 direction and a L1 direction. When prediction is performed for both a L0 direction and a L1 direction, motion information in a L0 direction and motion information in a L1 direction may be generated, respectively.

Figure 18:
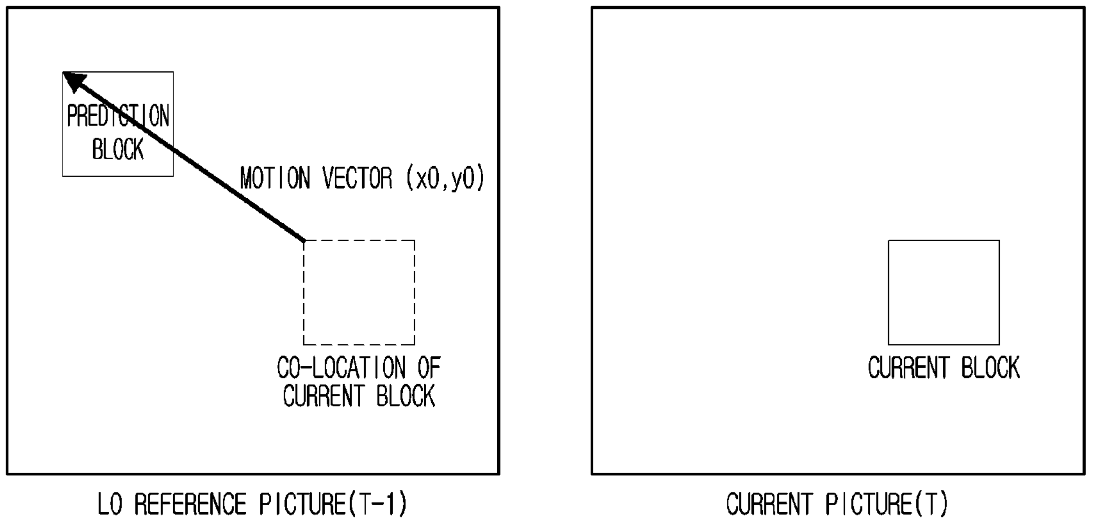
FIGS. 18 and 19 show an example in which a prediction block of a current block is generated based on motion information generated through motion estimation.
Figure 19:
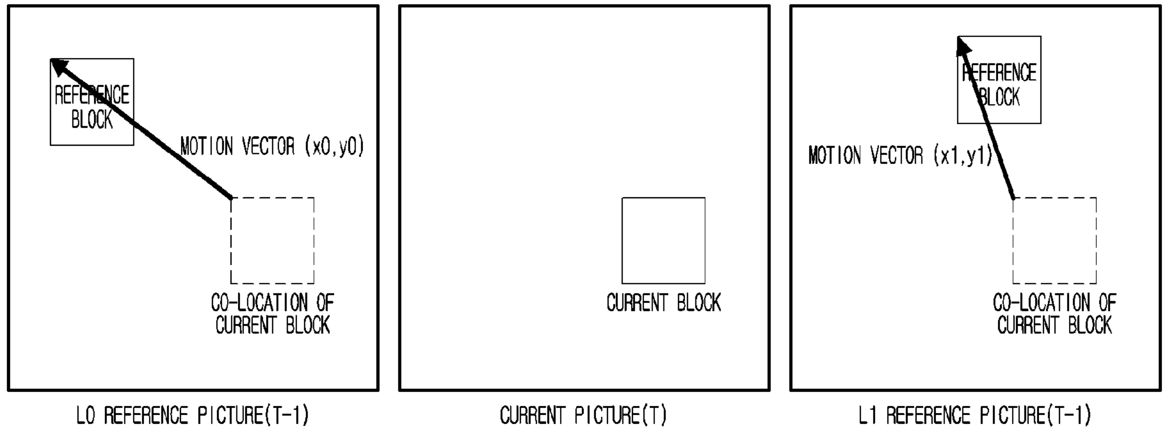

FIGS. 18 and 19 show an example in which a prediction block of a current block is generated based on motion information generated through motion estimation.

FIG. 18 shows an example in which a prediction block is generated by unidirectional (i.e., L0 direction) prediction, and FIG. 19 shows an example in which a prediction block is generated by bidirectional (i.e., L0 and L1 direction) prediction.

For unidirectional prediction, a prediction block of a current block is generated by using one motion information. As an example, the motion information may include prediction direction information indicating a L0 motion vector, a L0 reference picture index and a L0 direction.

For bidirectional prediction, a prediction block is generated by using two motion information. As an example, a reference block in a L0 direction specified based on motion information for a L0 direction (L0 motion information) may be set as a L0 prediction block, and a reference block in a L1 direction specified based on motion information for a L1 direction (L1 motion information) may be generated as a L1 prediction block. Afterwards, a L0 prediction block and a L1 prediction block may be weighted to generate a prediction block of a current block.

In an example shown in FIGS. 17 to 19, it was illustrated that a L0 reference picture exists in a previous direction of a current picture (i.e., with a POC value smaller than that of a current picture), and a L1 reference picture exists in a subsequent direction of a current picture (i.e., with a POC value larger than that of a current picture).

However, unlike a shown example, a L0 reference picture may exist in a subsequent direction of a current picture, or a L1 reference picture may exist in a previous direction of a current picture. As an example, both a L0 reference picture and a L1 reference picture may exist in a previous direction of a current picture, or may exist in a subsequent direction of a current picture. Alternatively, bidirectional prediction may be performed by using a L0 reference picture existing in a subsequent direction of a current picture and a L1 reference picture existing in a previous direction of a current picture.

Motion information of a block where inter prediction is performed may be stored in a memory. In this case, motion information may be stored in a unit of a sample. Specifically, motion information of a block to which a specific sample belongs may be stored as motion information of a specific sample. Stored motion information may be used to derive motion information of a neighboring block to be encoded/decoded in the future.

In an encoder, information that encodes a residual sample corresponding to a difference value between a prediction sample and a sample of a current block (i.e., an original sample) and motion information required to generate a prediction block may be signaled to a decoder. In a decoder, information about a signaled difference value may be decoded to derive a difference sample, and a prediction sample in a prediction block generated by using motion information may be added to the difference sample to generate a reconstructed sample.

In this case, in order to effectively compress motion information signaled to a decoder, one of a plurality of inter prediction modes may be selected. Here, a plurality of inter prediction modes may include a motion information merge mode and a motion vector prediction mode.

A motion vector prediction mode is a mode that encodes and signals a difference value between a motion vector and a motion vector prediction value. Here, a motion vector prediction value may be derived based on motion information of a neighboring block or a neighboring sample adjacent to a current block.

Figure 20:
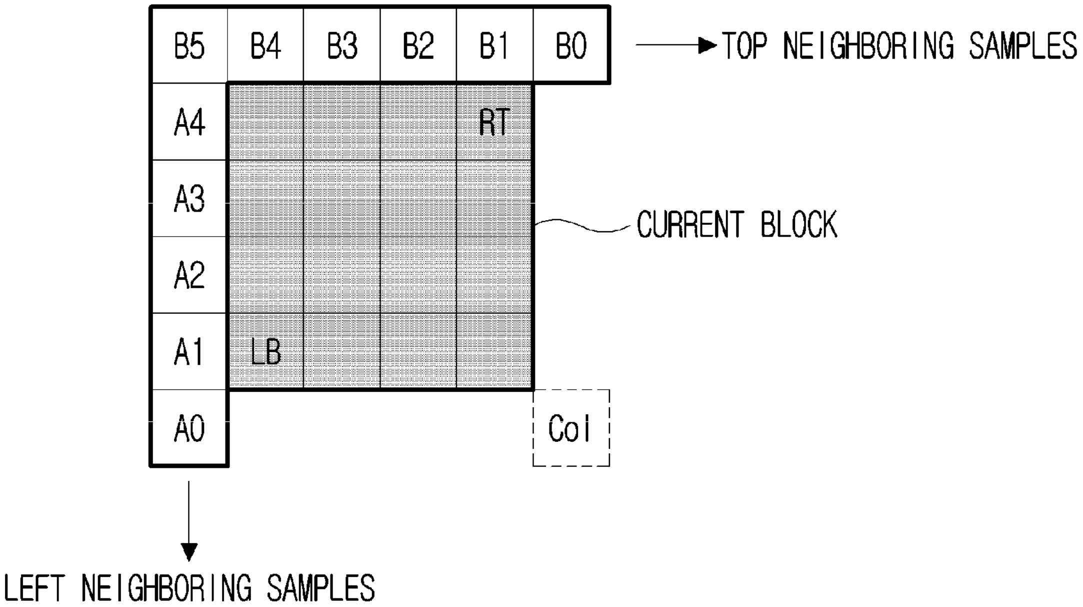
FIG. 20 shows a position referred to for deriving a motion vector prediction value.

FIG. 20 shows a position referred to for deriving a motion vector prediction value.

For convenience of a description, it is assumed that a current block has a 4×4 size.

In a shown example, 'LB' represents a sample included in the leftmost column and the bottommost row within a current block. 'RT' represents a sample included in the rightmost column and the uppermost row within a current block. A0 to A4 represent samples neighboring the left of a current block, and B0 to B5 represent samples neighboring the top of a current block. As an example, A1 represents a sample neighboring the left of LB, and B1 represents a sample neighboring the top of RT. A neighboring block that includes a sample spatially adjacent to a current block (i.e., one of A0 to A4 or one of B0 to B5) may be referred to as a spatial neighboring block.

Col represents a position of a sample neighboring the bottom-right of a current block in a co-located picture. A col-located picture is a picture different from a current picture, and information for specifying a col-located picture may be explicitly encoded and signaled in a bitstream. Alternatively, a reference picture having a predefined reference picture index may be set as a col-located picture. A neighboring block including a sample temporally adjacent to a current block (i.e., Col) may be referred to as a temporal neighboring block.

A motion vector prediction value of a current block may be derived from at least one motion vector prediction candidate included in a motion vector prediction list.

The number of motion vector prediction candidates that may be inserted into a motion vector prediction list (i.e., a size of a list) may be predefined in an encoder and a decoder. As an example, the maximum number of motion vector prediction candidates may be 2.

A motion vector stored in a position of a neighboring sample adjacent to a current block or a scaled motion vector derived by scaling the motion vector may be inserted into a motion vector prediction list as a motion vector prediction candidate. In this case, neighboring samples adjacent to a current block may be scanned in predefined order to derive a motion vector prediction candidate.

As an example, whether a motion vector is stored at each position in the order of A0 to A4 may be confirmed. And, according to the scan order, an available motion vector found first may be inserted into a motion vector prediction list as a motion vector prediction candidate.

As another example, whether a motion vector is stored at each position in the order of A0 to A4 is confirmed, and a motion vector at a position with the same reference picture as a current block that is found first may be inserted into a motion vector prediction list as a motion vector prediction candidate. If there is no neighboring sample that has the same reference picture as a current block, a motion vector prediction candidate may be derived based on an available vector found first. Specifically, after scaling an available motion vector found first, a scaled motion vector may be inserted into a motion vector prediction list as a motion vector prediction candidate. In this case, scaling may be performed based on an output order difference between a current picture and a reference picture (i.e., a POC difference) and an output order difference between a current picture and a reference picture of a neighboring sample (i.e., a POC difference).

Furthermore, in the order of B0 to B5, whether a motion vector is stored at each position may be confirmed. And, according to the scan order, an available motion vector found first may be inserted into a motion vector prediction list as a motion vector prediction candidate.

As another example, whether a motion vector is stored at each position in the order of B0 to B5 is confirmed, and a motion vector at a position with the same reference picture as a current block that is found first may be inserted into a motion vector prediction list as a motion vector prediction candidate. If there is no neighboring sample that has the same reference picture as a current block, a motion vector prediction candidate may be derived based on an available vector found first. Specifically, after scaling an available motion vector found first, a scaled motion vector may be inserted into a motion vector prediction list as a motion vector prediction candidate. In this case, scaling may be performed based on an output order difference between a current picture and a reference picture (i.e., a POC difference) and an output order difference between a current picture and a reference picture of a neighboring sample (i.e., a POC difference).

When a motion vector is stored in a unit of a block (e.g., 4×4), a motion vector prediction candidate may be derived based on a motion vector of a block including a sample at a predetermined position.

As in an example described above, a motion vector prediction candidate may be derived from a sample adjacent to the left of a current block, and a motion vector prediction candidate may be derived from a sample adjacent to the top of a current block.

In this case, a motion vector prediction candidate derived from a left sample may be inserted into a motion vector prediction list before a motion vector prediction candidate derived from a top sample. In this case, an index allocated to a motion vector prediction candidate derived from a left sample may have a smaller value than a motion vector prediction candidate derived from a top sample.

Conversely, a motion vector prediction candidate derived from a top sample may be inserted into a motion vector prediction list before a motion vector prediction candidate derived from a left sample.

Among the motion vector prediction candidates included in the motion vector prediction list, a motion vector prediction candidate with the highest encoding efficiency may be set as a motion vector predictor (MVP) of a current block. And, index information indicating a motion vector prediction candidate set as a motion vector prediction value of a current block among a plurality of motion vector prediction candidates may be encoded and signaled to a decoder. When the number of motion vector prediction candidates is 2, the index information may be a 1-bit flag (e.g., a MVP flag). In addition, a motion vector difference (MVD), which is a difference between a motion vector of a current block and a motion vector predictor, may be encoded and signaled to a decoder.

A decoder may configure a motion vector prediction list in the same manner as an encoder. In addition, index information may be decoded from a bitstream, and one of a plurality of motion vector prediction candidates may be selected based on decoded index information. A selected motion vector prediction candidate may be set as a motion vector prediction value of a current block.

In addition, a motion vector difference value may be decoded from a bitstream. Afterwards, a motion vector of a current block may be derived by combining a motion vector prediction value and a motion vector difference value.

When bidirectional prediction is applied to a current block, a motion vector prediction list may be generated for each of a L0 direction and a L1 direction. In other words a motion vector prediction list may be composed of motion vectors in the same direction. Accordingly, a motion vector of a current block and motion vector prediction candidates included in a motion vector prediction list have the same direction.

When a motion vector prediction mode is selected, a reference picture index and prediction direction information may be explicitly encoded and signaled to a decoder. As an example, when there are a plurality of reference pictures on a reference picture list and motion estimation is performed for each of a plurality of reference pictures, a reference picture index for specifying a reference picture where motion information of a current block is derived among the plurality of reference pictures may be explicitly encoded and signaled to a decoder.

In this case, when only one reference picture is included in a reference picture list, the encoding/decoding of the reference picture index may be omitted.

Prediction direction information may be an index indicating one of L0 unidirectional prediction, L1 unidirectional prediction, or bidirectional prediction. Alternatively, a L0 flag showing whether prediction for a L0 direction is performed and a L1 flag showing whether prediction for a L1 direction is performed may be encoded and signaled, respectively.

A motion information merge mode is a mode that sets the motion information of a current block to be the same as the motion information of a neighboring block. In a motion information merge mode, motion information may be decoded/encoded by using a motion information merge list.

A motion information merge candidate may be derived based on the motion information of a neighboring block or a neighboring sample adjacent to a current block. As an example, after pre-defining a reference position around a current block, whether motion information exists at a pre-defined reference position may be confirmed. When motion information exists at a pre-defined reference position, motion information at a corresponding position may be inserted into a motion information merge list as a motion information merge candidate.

In an example of FIG. 8, a pre-defined reference position may include at least one of A0, A1, B0, B1, B5 and Col. Furthermore, a motion information merge candidate may be derived in the order of A1, B1, B0, A0, B5 and Col.

When motion information is stored in a unit of a block (e.g., 4×4), a motion information merge candidate may be derived based on the motion information of a block including a sample at a pre-defined reference position.

Among the motion information merge candidates included in a motion information merge list, the motion information of a motion information merge candidate having an optimal cost may be set as the motion information of a current block. Furthermore, index information (e.g., a merge index) indicating a motion information merge candidate selected among a plurality of motion information merge candidates may be encoded and transmitted to a decoder.

In a decoder, a motion information merge list may be configured in the same way as in an encoder. And, a motion information merge candidate may be selected based on a merge index decoded from a bitstream. The motion information of a selected motion information merge candidate may be set as the motion information of a current block.

Unlike a motion vector prediction list, a motion information merge list is configured as a single list regardless of a prediction direction. In other words, a motion information merge candidate included in a motion information merge list may have only L0 motion information or L1 motion information, or may have bidirectional motion information (i.e., L0 motion information and L1 motion information).

Through intra prediction or inter prediction, a prediction block for a current block may be generated. Information indicating whether a prediction mode of a current block is intra prediction or inter prediction may be encoded and signaled. Here, a current block may be a CU, a TU or a PU.

Meanwhile, prediction information may be allocated to each sub-block within a current block based on information around a current block. Specifically, after a current block is divided into a plurality of sub-blocks, prediction information may be allocated to each of the sub-blocks.

Here, prediction information may be different according to a prediction mode of a current block. As an example, when intra prediction is applied to a current block, the prediction information may include an intra prediction mode. On the other hand, when inter prediction is applied to a current block, the prediction information may include at least one of a motion vector, a reference picture index, a prediction direction flag or bidirectional weight information.

Hereinafter, an example of allocating prediction information to each of the sub-blocks will be described in detail.

Figure 21:
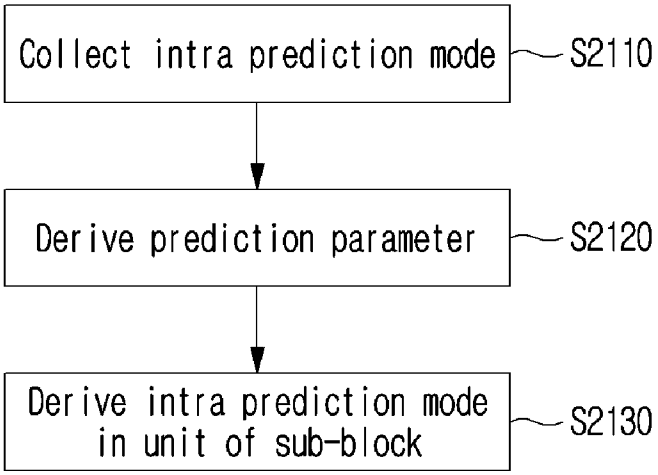
FIG. 21 is a flowchart of a procedure in which prediction information is allocated to each sub-block when intra prediction is applied to a current block.

FIG. 21 is a flowchart of a procedure in which prediction information is allocated to each sub-block when intra prediction is applied to a current block.

Referring to FIG. 21, first, an intra prediction mode may be collected from neighboring blocks of a current block S2110. Here, a neighboring block may include at least one of a neighboring block adjacent to a current block, or a neighboring sub-block adjacent to a current block and/or an extended boundary of a current block.

Figure 22:
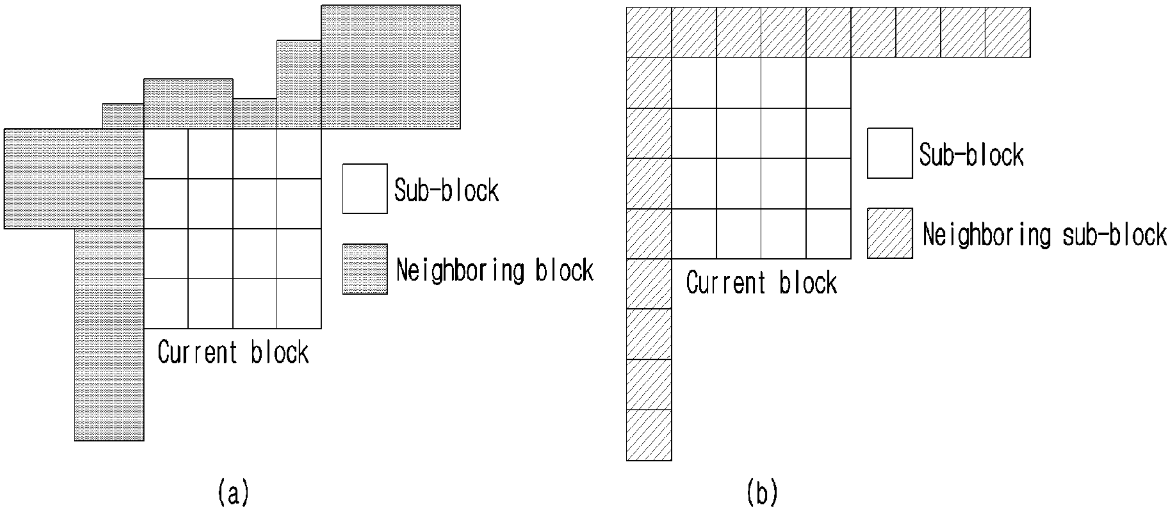
FIG. 22 is a diagram for describing an example in which an intra prediction mode is collected around a current block.

FIG. 22 is a diagram for describing an example in which an intra prediction mode is collected around a current block.

As in an example shown in FIG. 22(*a*), considering an actual encoding/decoding position and/or size of neighboring blocks adjacent to a current block, one intra prediction mode may be collected and stored from each of the neighboring blocks. Specifically, information on a position of a neighboring block and an intra prediction mode applied to a corresponding neighboring block may be stored.

Alternatively, as in an example shown in FIG. 22(*b*), an intra prediction mode may be collected from each of the neighboring sub-blocks in a unit of a block in a predefined size without considering an actual encoding/decoding position and/or size of neighboring blocks. Here, a predefined size may be 4×4 or 8×8, etc. As an example, when a predefined size is 4×4, information on an intra prediction mode and a position of a sub-block may be collected and stored from each of the 4×4-sized sub-blocks around a current block.

Meanwhile, as in an example shown in FIG. 22(*b*), neighboring sub-blocks where an intra prediction mode is collected may include not only sub-blocks adjacent to a current block, but also sub-blocks adjacent to an extended boundary when a width or a height of a current block is doubled.

In an example shown in FIG. 22(*a*), there are seven neighboring blocks adjacent to a current block. Accordingly, in FIG. 22(*a*), up to 7 block position and intra prediction mode pairs may be collected.

In an example shown in FIG. 22(*b*), it was illustrated that the total number of sub-blocks at a top position or a left position of a current block is 13. Accordingly, in FIG. 22(*b*), up to 13 block position and intra prediction mode pairs may be collected.

Information on a block position may include at least one of an address allocated to a corresponding block or a coordinate of a specific sample within a corresponding block. Here, an address represents a value set by sequentially numbering neighboring blocks. As an example, [x, 0] may represent an address allocated to neighboring blocks adjacent to the top of a current block. Specifically, for neighboring blocks adjacent to the top of a current block, an address may be allocated to ensure that a value of x increases sequentially in order from left to right. As an example, an address of [0, 0] may be allocated to the leftmost block among the top neighboring blocks, while an address of [1, 0] may be allocated to a right block of the leftmost block.

In addition, [0, y] represents an address allocated to neighboring blocks neighboring the left of a current block. Specifically, for neighboring blocks adjacent to the left of a current block, an address may be allocated to ensure that a value of y increases sequentially in order from top to bottom. As an example, an address of [0, 0] may be allocated to the uppermost block among the left neighboring blocks, while an address of [0, 1] may be allocated to a bottom block of the uppermost block.

In addition, a specific sample may be positioned at a top-left corner, a top-right corner, a bottom-left corner, a bottom-right corner or the center within a block. A coordinate of a specific sample may be calculated based on a position of a current block or a picture position. As an example, a coordinate of a specific sample may be calculated by assuming that a coordinate of a top-left sample of a current block is (0, 0).

Meanwhile, when a neighboring block is unavailable, an unavailable neighboring block may not be used to derive a prediction parameter. In other words, an intra prediction mode may not be collected from an unavailable neighboring block. In this case, a neighboring block may be determined to be unavailable for at least one of a case in which a neighboring block is not encoded by intra prediction, a case in which a neighboring block is beyond a picture boundary or a case in which a neighboring block is beyond a coding tree unit boundary, a slice boundary or a tile boundary.

At least one of a position, a size or the number of neighboring blocks where information is collected may be predefined in an encoder and a decoder. Alternatively, at least one of a position, a size or the number of neighboring blocks that are a target for prediction information collection may be adaptively determined according to a size or a shape of a current block.

Based on an intra prediction mode collected from neighboring blocks of a current block, a prediction parameter may be derived S2120. Specifically, if information on a position and an intra prediction mode for each of the neighboring blocks is collected, a prediction parameter that minimizes a difference between a position and an intra prediction mode of neighboring blocks may be derived.

Equation 5 represents a formula for deriving a prediction parameter.

$$\text{INTRA\_MODE}[x, y] = \alpha_1 x + \alpha_2 y + \beta \quad \text{[Equation 5]}$$

In Equation 5 above, INTRA_MODE[x, y] represents an intra prediction mode of a neighboring block at a position of [x, y]. [x, y] represents a position of a neighboring block. According to a method of collecting position information, [x, y] may represent an address allocated to a neighboring block or may represent a position of a specific sample within a neighboring block. In Equation 5 above, a linear regression method may be used to derive prediction parameters $\alpha_1$, $\alpha_2$, and $\beta$. As an example, a linear regression method such as a least square method may be used to derive prediction parameters $\alpha_1$, $\alpha_2$, and $\beta$.

A prediction parameter includes a weight ($\alpha_1$ and $\alpha_2$) and offset $\beta$. A weight may be a value multiplied by a position, and an offset may be a value added/subtracted to/from a result of applying a weight. Each of a weight and an offset may be 0 or a non-zero integer.

Meanwhile, weight $\alpha_1$ applied to a x-axis position and weight $\alpha_2$ applied to a y-axis position may be set as the same value.

Once a prediction parameter is derived, an intra prediction mode for each sub-block in a current block may be derived based on a derived prediction parameter S2130. Specifically, a position (x, y) of a sub-block in a current block may be substituted into Equation 5 above to derive INTRA_MODE [x, y], an intra prediction mode for a sub-block. Here, a position of a sub-block may include at least one of an address allocated to a sub-block or a position of a specific sample in a sub-block. As an example, when an address allocated to a sub-block is represented as [x, y], x represents a column to which a sub-block belongs and y represents a row to which a sub-block belongs, wherein each may be a natural number equal to or greater than 0 or 1. For example, an address allocated to a sub-block positioned at a top-left corner of a current block may be set as [1, 1].

A specific sample may be a sample at a top-left corner, a top-right corner, a bottom-left corner, a bottom-right corner or a center position of a sub-block.

Meanwhile, there may be a case in which a result output through Equation 5 is out of an intra prediction mode range predefined in an encoder and a decoder (e.g., intra prediction modes from No. 0 to No. 66 in FIG. 5). In order to solve the problem, a result output through Equation 5 may be clipped (i.e., a clip function may be applied) to adjust it within an intra prediction mode range predefined in an encoder and a decoder.

Alternatively, when a result output through Equation 5 is out of a predefined intra prediction mode range, an intra prediction mode of a current block may be derived by adding or subtracting a predefined value. As an example, when it is assumed that a predefined intra prediction mode range is 2 to 66 as in FIG. 4, if a result output through Equation 5 exceeds 66, what is obtained by subtracting the number of directional intra prediction modes, i.e., 65 from an output result may be set as an intra prediction mode of a current block. For example, when a result output through Equation 5 has a value smaller than 0, what is obtained by adding the number of directional intra prediction modes, i.e., 65 to an output result may be set as an intra prediction mode of a current block.

Alternatively, when a result output through Equation 5 is out of a predefined intra prediction mode range, an intra prediction mode with the smallest difference from an output result may be set as an intra prediction mode of a sub-block.

When an intra prediction mode is allocated to each sub-block, intra prediction may be performed independently for each sub-block.

Meanwhile, a size of a sub-block may be predefined in an encoder and a decoder. As an example, a sub-block may have a size of 4×4 or 8×8.

Alternatively, a size or a shape of a sub-block may be adaptively determined according to a size or a shape of a current block. As an example, when a size of a current block is smaller than a threshold value, a sub-block may be determined to have a size of 4×4, while when a size of a current block is larger than a threshold value, a sub-block may be determined to have a size of 8×8. Here, a size of a current block may represent at least one of a width, a height or a product of a width and a height.

Figure 23:
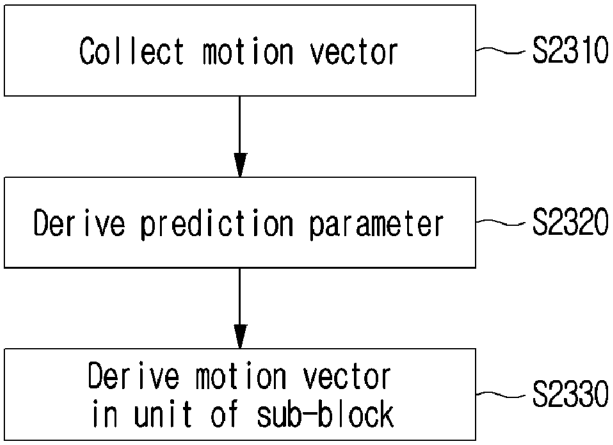
FIG. 23 is a flowchart of a procedure in which prediction information is allocated to each sub-block when inter prediction is applied to a current block.

FIG. 23 is a flowchart of a procedure in which prediction information is allocated to each sub-block when inter prediction is applied to a current block.

Referring to FIG. 23, first, a motion vector may be collected from neighboring blocks of a current block S2310. Here, a neighboring block, as described through FIG. 22, may include at least one of a neighboring block adjacent to a current block, a current block and/or a neighboring sub-block adjacent to an extended boundary of a current block.

Meanwhile, considering that a reference picture of neighboring blocks may be different, when a reference picture of a neighboring block is not a basis reference picture, a motion vector of a neighboring block may be scaled and then, a scaled motion vector may be collected.

Here, a basis reference picture may be a reference picture with a reference picture index of 0 or a reference picture with the smallest distance from a current picture (i.e., a Picture Order Count (POC) difference) among the reference pictures.

A motion vector of a neighboring block may be scaled based on an output order (i.e., POC) difference between a basis reference picture and a current picture and an output order difference between a current picture and a reference picture of a neighboring block.

Meanwhile, along with a motion vector of a neighboring block, a position of a neighboring block may be further collected. Here, information on a block position may include at least one of an address allocated to a corresponding block or a coordinate of a specific sample within a corresponding block.

Based on a motion vector collected from neighboring blocks of a current block, a prediction parameter may be derived S2320. Specifically, when a position and a motion vector for each neighboring block are collected, a prediction parameter that minimizes a difference between a position and a motion vector of neighboring blocks may be derived.

Equation 6 represents a formula for deriving a prediction parameter.

$$\begin{bmatrix} \text{MV\_X}[x, y] \\ \text{MV\_Y}[x, y] \end{bmatrix} = \begin{bmatrix} \alpha_1 & \alpha_2 \\ \alpha_3 & \alpha_4 \end{bmatrix} \begin{bmatrix} x \\ y \end{bmatrix} + \begin{bmatrix} \beta_1 \\ \beta_2 \end{bmatrix} \quad \text{[Equation 6]}$$

In Equation 6 above, each of MV_X[x,y] and MV_Y[x,y] represents a horizontal component and a vertical component of a motion vector of a neighboring block at a position of [x, y]. According to a method of collecting position information, [x, y] may represent an address allocated to a neighboring block or may represent a position of a specific sample within a neighboring block. In Equation 6 above, a linear regression method may be used to derive prediction parameters $\alpha_1$, $\alpha_2$, $\alpha_3$, $\alpha_4$, $\beta_1$ and $\beta_2$. As an example, a linear regression method such as a least square method may be used to derive prediction parameters $\alpha_1$, $\alpha_2$, $\alpha_3$, $\alpha_4$, $\beta_1$ and $\beta_2$.

A prediction parameter includes a weight ($\alpha_1$, $\alpha_2$, $\alpha_3$ and $\alpha_4$) and an offset ($\beta_1$ and $\beta_2$). A prediction parameter may include a pair of weights multiplied by a x-coordinate ($\alpha_1$ and $\alpha_3$) and a pair of weights multiplied by a y-coordinate ($\alpha_2$ and $\alpha_4$). A weight may be a value multiplied by a position, and an offset may be a value added/subtracted to/from a result of applying a weight.

When a prediction parameter is derived, a motion vector for each sub-block in a current block may be derived based on a derived prediction parameter S2330. Specifically, a position (x, y) of a sub-block in a current block may be substituted into Equation 6 above to derive a motion vector for a sub-block (MV_X[x, y], MV_Y[x, y]). Here, a position of a sub-block may include at least one of an address allocated to a sub-block or a position of a specific sample in a sub-block. As an example, when an address allocated to a sub-block is represented as [x, y], x may represent a column to which a sub-block belongs and y may represent a row to which a sub-block belongs.

A specific sample may be a sample at a top-left corner, a top-right corner, a bottom-left corner, a bottom-right corner or a center position of a sub-block.

Meanwhile, in order to prevent a size of a horizontal motion vector and a vertical motion vector output through Equation 6 from exceeding a threshold value, an output result may be clipped. Here, a threshold value may be a value predefined in an encoder and a decoder, or may be adaptively determined according to a bit depth, a size of a picture or a color component.

When a motion vector is allocated to each sub-block, inter prediction may be performed independently for each sub-block. In this case, inter prediction for a sub-block may be performed based on a basis reference picture. Specifically, a sub-reference block specified based on a motion vector of a sub-block in a basis reference picture may be set as a prediction block of a sub-block.

Meanwhile, a size of a sub-block may be predefined in an encoder and a decoder. As an example, a sub-block may have a size of 4×4 or 8×8.

A motion vector derivation method based on a prediction parameter shown in FIG. 23 may be applied independently for each of a L0 direction and a L1 direction. As an example, whether to apply a motion vector derivation method based on a prediction parameter independently for each of a L0 direction and a L1 direction may be determined.

When a motion vector derivation method based on a prediction parameter is applied to a L0 direction, a prediction parameter may be derived by collecting a motion vector in a L0 direction from neighboring blocks of a current block. On the other hand, when a motion vector derivation method based on a prediction parameter is applied to a L1 direction, a prediction parameter may be derived by collecting a motion vector in a L1 direction from neighboring blocks of a current block.

Alternatively, after determining whether L0 prediction is applied to a current block, whether L1 prediction is applied or whether bidirectional prediction is applied, whether to apply a motion vector derivation method based on a prediction parameter only for a direction applied to a current block may be determined.

In order to determine whether at least one of L0 prediction or L1 prediction is applied to a current block, at least one of a L0 prediction flag showing whether L0 prediction is applied, a L1 prediction flag showing whether L1 prediction is applied, a bidirectional prediction flag showing whether bidirectional prediction is applied or a prediction direction index indicating one of the prediction direction candidates may be encoded and signaled.

Meanwhile, when a motion vector is collected from neighboring blocks, there may be a case in which a neighboring block does not have motion information for a prediction direction to be collected.

As an example, when a motion vector derivation method based on a prediction parameter is applied to L0 direction, a L0 motion vector must be collected from a neighboring block of a current block. In this case, when a L0 motion vector does not exist and only a L0 motion vector exists in a neighboring block or when a neighboring block is encoded by intra prediction, a corresponding neighboring block may not be used to derive a prediction parameter.

Alternatively, when a L0 motion vector does not exist and only a L1 motion vector exists in a neighboring block, what is obtained by scaling a L1 reference picture according to the output order of basis reference pictures on a L0 reference picture list (e.g., a reference picture with an index of 0 or a reference picture closest to a current picture among the reference pictures) may be used to derive a prediction parameter.

In the above-described example, it was described that a prediction parameter for a current block is derived based on information collected from a neighboring block and prediction information for each sub-block in a current block is derived based on a derived prediction parameter.

Unlike a described example, a prediction parameter of a current block may also be derived based on a prediction parameter of a neighboring block.

Specifically, a prediction parameter of a current block may be set to be the same as a prediction parameter of a neighboring block adjacent to a current block. A neighboring block may include at least one of a top neighboring block, a left neighboring block, a top-left neighboring block, a top-right neighboring block or a bottom-left neighboring block of a current block.

Alternatively, a prediction parameter candidate may be derived from at least one neighboring block adjacent to a current block, and a candidate list may be generated based on the prediction parameter candidate. In this case, at least one neighboring block may include at least one of a top neighboring block, a left neighboring block, a top-left neighboring block, a top-right neighboring block or a bottom-left neighboring block of a current block. After setting a prediction parameter of a neighboring block as a prediction parameter candidate, a corresponding prediction parameter candidate may be inserted into a candidate list.

When a plurality of prediction parameter candidates are inserted into a candidate list, index information indicating one of a plurality of prediction parameter candidates may be encoded and signaled. A prediction parameter candidate selected by the index information may be set as a prediction parameter of a current block.

Alternatively, prediction parameter candidate selected by the index information may be set as a prediction value of a prediction parameter of a current block, and a difference value of a prediction parameter of a block may be added to the prediction value to derive a prediction parameter of a current block. For this purpose, a difference between a prediction parameter candidate and a prediction parameter of a current block may be encoded and signaled.

Information showing whether a prediction parameter of a current block is actively derived by prediction information collected from neighboring blocks or whether a prediction parameter of a current block is derived based on a prediction parameter of a neighboring block may be encoded and signaled. As an example, the information may be a 1-bit flag.

Based on at least one of a size or a shape of a current block, whether it is allowed to derive a prediction parameter of a current block by prediction information collected from neighboring blocks or whether it is allowed to derive a prediction parameter of a current block based on a prediction parameter of a neighboring block may be determined. As an example, when deriving a prediction parameter of a current block by prediction information collected from neighboring blocks is not allowed for a current block, decoding/encoding of the flag may be omitted, and it may be determined to derive a prediction parameter of a current block based on a prediction parameter a of neighboring block. Alternatively, when deriving a prediction parameter of a current block based on a prediction parameter of a neighboring block is not allowed for a current block, encoding/encoding of the flag may be omitted, and it may be determined to derive a prediction parameter of a current block based on prediction information collected from neighboring blocks.

Alternatively, as a process of deriving a prediction parameter is omitted, prediction information of each sub-block in a neighboring block adjacent to a current block (i.e., an intra prediction mode or a motion vector) may be set as prediction information of each sub-block in a current block.

In FIGS. 21 and 23, it was described that prediction information is derived for each sub-block in a current block based on a prediction parameter. Instead of deriving prediction information in a unit of a sub-block by simplifying embodiments in FIGS. 21 and 23, prediction information may be derived in a unit of a block. In other words, when a prediction parameter for a current block is derived, a position of a specific sample in a current block may be inserted into Equation 5 or Equation 6 to derive prediction information for a current block. Here, a specific sample may be a sample at a top-left corner, a top-right corner, a bottom-left corner, a bottom-right corner or a center position of a current block. Deriving prediction information for a current block, not a unit of a sub-block, is the same as allocating the same prediction information to all sub-blocks within a current block.

Information showing a unit deriving prediction information (i.e., whether to derive prediction information in a unit of a block or whether to derive prediction information in a unit of a sub-block) may be encoded and signaled.

Alternatively, a unit of deriving prediction information may be adaptively determined based on at least one of a size of a current block, a ratio of a width and a height of a current block or a color component to be encoded/decoded. As an example, when a luma block is encoded/decoded, prediction information may be derived in a unit of a sub-block. On the other hand, when a chroma block is encoded/decoded, prediction information may be derived in a unit of a block. In other words, when a chroma block is encoded/decoded, one prediction information may be allocated to the entire chroma block by using a position of a specific sample in a chroma block.

When a motion of an object appears as a size change or rotation, an affine model may be used to compensate for a motion of an object. When an affine model is applied to a current block, a control point motion vector for an affine model may also be derived based on a prediction parameter of a current block. Meanwhile, information showing whether an affine model is applied to a current block may be encoded and signaled. The information may be a 1-bit flag or an index indicating one of a plurality of motion candidates.

An affine model using 6 parameters may be expressed as in Equation 7 below.

$$\begin{bmatrix} MV\_X[x,y] \\ MV\_Y[x,y] \end{bmatrix} = \begin{bmatrix} \frac{mv_{1x}-mv_{0x}}{W}x + \frac{mv_{2x}-mv_{0x}}{H}y + mv_{0x} \\ \frac{mv_{1y}-mv_{0y}}{W}x + \frac{mv_{2y}-mv_{0y}}{H}y + mv_{0y} \end{bmatrix} \quad \text{[Equation 7]}$$

In Equation 7 above, each of $(mv_{0x}, mv_{0y})$, $(mv_{1x}, mv_{1y})$ and $(mv_{2x}, mv_{2y})$ represents a control point motion vector (CPMV) of a current block. Each of $(mv_{0x}, mv_{0y})$, $(mv_{1x}, mv_{1y})$ and $(mv_{2x}, mv_{2y})$ may be expressed as $v_0$, $v_1$ and $v_2$. In addition, in Equation 7, W and H represent a width and a height of a current block, respectively.

An affine model using 4 parameters may be expressed as in Equation 8 below.

$$\begin{bmatrix} MV\_X[x,y] \\ MV\_Y[x,y] \end{bmatrix} = \begin{bmatrix} \frac{mv_{1x}-mv_{0x}}{W}x + \frac{mv_{1y}-mv_{0y}}{W}y + mv_{0x} \\ \frac{mv_{0y}-mv_{1y}}{W}x + \frac{mv_{1x}-mv_{0x}}{W}y + mv_{0y} \end{bmatrix} \quad \text{[Equation 8]}$$

Based on control point motion vectors of a current block, a position of [x, y] in a current block or a motion vector of a sub-block included in a sample at a position of [x, y] (MV_X[x, y], MV_Y[x, y]) may be derived.

Figure 24:
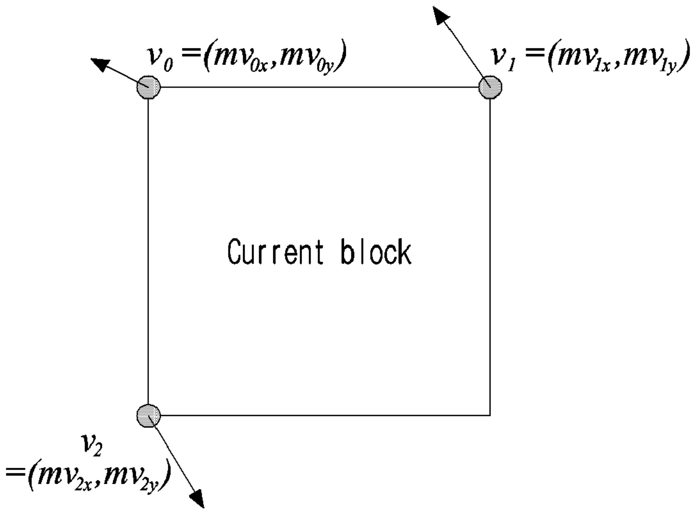
FIG. 24 shows control point motion vectors of a current block.
Figure 24:
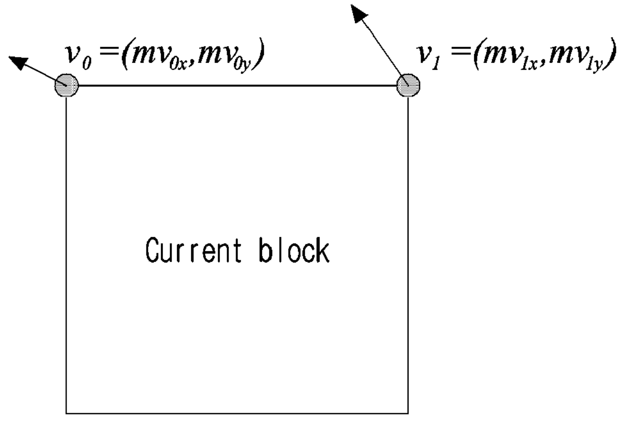

FIG. 24 shows control point motion vectors of a current block.

When a 6-parameter affine model is applied, as in an example shown in FIG. 24(*a*), three control point motion vectors may be used. Specifically, $v_0$, a motion vector of a control point corresponding to a top-left corner of a current block, $v_1$, a motion vector of a control point corresponding to a top-right corner and $v_2$, a motion vector of a control point corresponding to a bottom-left corner, may be used.

Meanwhile, when a 4-parameter affine model is applied, two control point motion vectors shown in FIG. 24(*b*) may be used. Specifically, $v_0$, a motion vector of a control point corresponding to a top-left corner of a current block, and $v_1$, a motion vector of a control point corresponding to a top-right corner, may be used. Alternatively, unlike a shown example, $v_0$, a motion vector of a control point corresponding to a top-left corner of a current block, and $v_2$, a motion vector of a control point corresponding to a bottom-left corner, may also be used.

Control point motion vectors of a current block may be derived as a combination of translational motion vectors of neighboring blocks or a neighboring block encoded by an affine model.

As another example, control point motion vectors of a current block may be derived by using a prediction parameter of a current block. Specifically, based on Equation 6, prediction parameters $\alpha_1$, $\alpha_2$, $\alpha_3$, $\alpha_4$, $\beta_1$ and $\beta_2$ derived based on a motion vector of neighboring blocks adjacent to a current block may be derived. Then, each of the derived prediction parameters $\alpha_1$, $\alpha_2$, $\alpha_3$, $\alpha_4$, $\beta_1$ and $\beta_2$ may be matched to each term of Equation 7 or Equation 8 according to the number of parameters of an affine model. As an example, when a 6-parameter affine model is applied, each prediction parameter may be matched to each term of Equation 7 to set a correlation between a prediction parameter and a control point motion vector as in Equation 9 below.

[Equation 9]

$$\alpha_1 = \frac{mv_{1x} - mv_{0x}}{W}$$
$$\alpha_2 = \frac{mv_{2x} - mv_{0x}}{H}$$
$$\alpha_3 = \frac{mv_{1y} - mv_{0y}}{W}$$
$$\alpha_4 = \frac{mv_{2y} - mv_{0y}}{W}$$
$$\beta_1 = mv_{0x}$$
$$\beta_2 = mv_{0_Y}$$

Based on Equation 9 above, a first control point motion vector $v_0$ (i.e., $(mv_{0x}, mv_{0y})$), a second control point motion vector $v_1$ (i.e., $(mv_{1x}, mv_{1y})$), and a third control point motion vector $v_2$ (i.e., $(mv_{2x}, mv_{2y})$) of a current block may be derived.

Alternatively, when a 4-parameter affine model is applied, the number of prediction parameters may be adjusted to match the number of variables of a 4-parameter affine model. Specifically, Equation 6 may be modified as in Equation 10 below.

[Equation 10]

$$\begin{bmatrix} MV\_X[x, y] \\ MV\_Y[x, y] \end{bmatrix} = \begin{bmatrix} \alpha_1 & \alpha_2 \\ -\alpha_2 & \alpha_1 \end{bmatrix} \begin{bmatrix} x \\ y \end{bmatrix} + \begin{bmatrix} \beta_1 \\ \beta_2 \end{bmatrix}$$

And then, each prediction parameter may be matched to each term of Equation 8 to set a correlation between a prediction parameter and a control point motion vector as in Equation 11 below.

[Equation 11]

$$\alpha_1 = \frac{mv_{1x} - mv_{0x}}{W}$$
$$\alpha_2 = \frac{mv_{1y} - mv_{0y}}{W}$$
$$\beta_1 = mv_{0x}$$
$$\beta_2 = mv_{0_Y}$$

Based on Equation 11 above, a first control point motion vector $v_0$ (i.e., $(mv_{0x}, mv_{0y})$) and a second control point motion vector $v_1$ (i.e., $(mv_{1x}, mv_{1y})$) of a current block may be derived.

Each control point motion vector derived based on a prediction parameter may also be set as a prediction value of a control point motion vector of a current block. In this case, a control point motion vector of a current block may be derived by adding a difference of a control point motion vector to a control point motion vector derived based on a prediction parameter. Furthermore, an encoder may encode and signal information showing a difference of a control point motion vector.

A term of syntaxes used in the above-described embodiments is just named for convenience of a description.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described embodiment is described based on a series of steps or flow charts, but it does not limit a time series order of the present disclosure and if necessary, it may be performed at the same time or in different order. In addition, each component (e.g., a unit, a module, etc.) configuring a block diagram in the above-described embodiment may be implemented as a hardware device or software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

Embodiments through the present disclosure may be applied to an electronic device which encodes or decodes an image.

The invention claimed is:

1. A method of decoding an image, the method comprising:

constructing a prediction parameter candidate list of a current block, the prediction parameter candidate list comprising a plurality of prediction parameter candidates;

deriving prediction parameters of the current block; and deriving, based on the prediction parameters, control point motion vectors of the current block, wherein the control point motion vectors of the current block comprise a top-left control point motion vector, a top-right control point motion vector and a left-bottom control point motion vector, and wherein the prediction parameters are inherited from one of the plurality of prediction parameter candidates included in the prediction parameter candidate list.

2. The method of claim 1, wherein the prediction parameters of the current block comprise four weighting parameters and two offset vectors.

3. The method of claim 2, wherein each of the control point motion vectors is derived by applying a weighting factor to a corner position corresponding to a control point motion vector and an offset vector.

4. The method of claim 1, wherein the prediction parameters are derived independently for each of a L0 direction and a L1 direction.

5. The method of claim 1, wherein a motion vector of each of sub-blocks in the current block is derived based on the control point motion vectors of the current block.

6. The method of claim 1, wherein a prediction parameter candidate is derived based on a neighboring block adjacent to the current block.

7. The method of claim 1, wherein the one of prediction parameter candidates is specified based on index information decoded from a bitstream.

8. A method of encoding an image, the method comprising:

constructing a prediction parameter candidate list of a current block, the prediction parameter candidate list comprising a plurality of prediction parameter candidates;

deriving prediction parameters of the current block; and deriving, based on the prediction parameters, control point motion vectors of the current block, wherein the control point motion vectors of the current block comprise a top-left control point motion vector, a top-right control point motion vector and a left-bottom control point motion vector, and wherein the prediction parameters are inherited from one of the plurality of prediction parameter candidates included in the prediction parameter candidate list.

9. A method of transmitting compressed video data, the method comprising:

generating the compressed video data; and transmitting the compressed video data, wherein generating the compressed video data comprises:

constructing a prediction parameter candidate list of a current block, the prediction parameter candidate list comprising a plurality of prediction parameter candidates;

deriving prediction parameters of the current block; and deriving, based on the prediction parameters, control point motion vectors of the current block, wherein the control point motion vectors of the current block comprise a top-left control point motion vector, a top-right control point motion vector and a left-bottom control point motion vector, and wherein the prediction parameters are inherited from one of the plurality of prediction parameter candidates included in the prediction parameter candidate list.

* * * * *